(12) United States Patent
Fazili et al.

(10) Patent No.: US 12,362,819 B2
(45) Date of Patent: Jul. 15, 2025

(54) REPEATERS, WIRELESS INTERFERENCE MANAGEMENT, AND BEAMFORMING CONTROL IN A WIRELESS NETWORK

(71) Applicant: Charter Communications Operating, LLC, St. Louis, MO (US)

(72) Inventors: Muhammad Usman Fazili, Audubon, PA (US); Aditi Singh, San Diego, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 399 days.

(21) Appl. No.: 17/852,914

(22) Filed: Jun. 29, 2022

(65) Prior Publication Data

US 2023/0354127 A1 Nov. 2, 2023

Related U.S. Application Data

(60) Provisional application No. 63/336,260, filed on Apr. 28, 2022.

(51) Int. Cl.
*H04B 7/005* (2006.01)
*H04B 7/0426* (2017.01)
(Continued)

(52) U.S. Cl.
CPC ......... *H04B 7/15507* (2013.01); *H04B 7/043* (2013.01); *H04B 7/0452* (2013.01);
(Continued)

(58) Field of Classification Search
CPC .. H04B 7/15507; H04B 7/043; H04B 7/0452; H04B 7/15528; H04B 7/0617;
(Continued)

(56) References Cited

U.S. PATENT DOCUMENTS 6,404,775 B1 6/2002 Leslie et al.
2010/0022184 A1* 1/2010 Khoshnevis .......... H04L 1/1607
455/7
(Continued)

FOREIGN PATENT DOCUMENTS

| EP | 3471289 A1 * | 4/2019 | ........... H04B 7/0617 |
| WO | WO-2013091678 A1 * | 6/2013 | ........... H04W 36/08 |
| WO | WO-2021202469 A1 * | 10/2021 | ......... H04B 7/15535 |

OTHER PUBLICATIONS

3GPP TS 38.211, V16.0.0, 3rd Generation Partnership Project; Technical Specification Radio Access Network; NR: "Physical channels and modulation" (Release 16), Dec. 2019, (date: Dec. 2019), pp. 1-100.
(Continued)

*Primary Examiner* — Thai Dinh Hoang
(74) *Attorney, Agent, or Firm* — Armis IP Law, LLC

(57) ABSTRACT

A network environment includes a wireless base station, a repeater wireless station, and one or more mobile communication devices (a.k.a., user equipment). A communication management resource associated with the wireless base station receives a communication from a repeater wireless station. In response to the communication, the communication management resource establishes a wireless communication link between the wireless base station and the repeater wireless station. For example, the communication management resource associated with the wireless base station communicates beamforming control information from the wireless base station to the repeater wireless station. The beamforming control information controls beamforming functions of the repeater wireless station and corresponding wireless connectivity with a first mobile communication device. During operation, a communication management resource monitors for wireless interference in the network
(Continued)

1100 →

MONITOR WIRELESS POWER LEVELS AT WHICH A FIRST MOBILE COMMUNICATION DEVICE AND A SECOND MOBILE COMMUNICATION DEVICE RECEIVE WIRELESS SIGNALS, THE FIRST MOBILE COMMUNICATION DEVICE IN COMMUNICATION WITH A FIRST WIRELESS BASE STATION THROUGH A REPEATER WIRELESS STATION — 1110

↓

BASED ON THE MONITORING OF THE WIRELESS POWER LEVELS, DETECT WIRELESS INTERFERENCE ASSOCIATED WITH A FIRST WIRELESS BEAM SUPPORTED BY THE REPEATER WIRELESS STATION — 1120

↓

IN RESPONSE TO THE WIRELESS INTERFERENCE, TERMINATE USE OF THE FIRST WIRELESS BEAM — 1130 environment and selectively terminates one or more wireless beams from the repeater wireless stations as needed to reduce wireless interference.

32 Claims, 11 Drawing Sheets

(51) Int. Cl.
| | |
|---|---|
| *H04B 7/0452* | (2017.01) |
| *H04B 7/155* | (2006.01) |
| *H04W 36/06* | (2009.01) |
| *H04W 36/08* | (2009.01) |
| *H04W 36/30* | (2009.01) |
| *H04W 72/044* | (2023.01) |
| *H04W 72/54* | (2023.01) |
| *H04W 74/0833* | (2024.01) |

(52) U.S. Cl.
CPC .......... *H04W 36/06* (2013.01); *H04W 36/08* (2013.01); *H04W 36/305* (2018.08); *H04W 72/046* (2013.01); *H04W 72/54* (2023.01); *H04W 74/0833* (2013.01)

(58) Field of Classification Search
CPC ... H04W 36/06; H04W 36/08; H04W 36/305; H04W 72/046; H04W 72/54; H04W 74/0833
See application file for complete search history.

(56) References Cited

U.S. PATENT DOCUMENTS

| | | | | |
|---|---|---|---|---|
| 2012/0063492 | A1* | 3/2012 | Palanki | H04W 56/001 |
| | | | | 375/211 |
| 2021/0306959 | A1* | 9/2021 | Abedini | H04W 52/242 |
| 2022/0078653 | A1* | 3/2022 | Ly | H04W 48/12 |
| 2022/0103247 | A1 | 3/2022 | Abedini et al. | |
| 2022/0311503 | A1* | 9/2022 | Islam | H04L 5/0098 |
| 2023/0032511 | A1* | 2/2023 | Horn | H04B 7/15528 |
| 2023/0096726 | A1* | 3/2023 | Elshafie | H04W 40/12 |
| | | | | 370/329 |
| 2023/0156751 | A1 | 5/2023 | Wang et al. | |
| 2023/0170962 | A1* | 6/2023 | Ali | H04L 5/0094 |
| | | | | 370/252 |
| 2023/0171036 | A1* | 6/2023 | Selvanesan | H04L 1/1635 |
| | | | | 370/315 |

OTHER PUBLICATIONS

3GPP TS 38.213 V16.0.0, 3rd Generation Partnership Project; Technical Specification Group Radio Access Network; NR; "Physical layer procedures for control", Release 16, Dec. 2019, (date: Dec. 2019), pp. 1-155.

ETSI TS 138 331 V 16.1.0, 5G; NR; Radio Resource Control (RRC); Protocol specification, 3GPP TS 38.331 version 16.1.0 (Release 16), Jul. 2020, pp. 1-866.

ZTE Corporation, 3GPP TSG RAN Meeting #94e, RP 213700, "New SI: Study on NR Network-controlled Repeaters", Dec. 6-17, 2021, pp. 1-4.

* cited by examiner

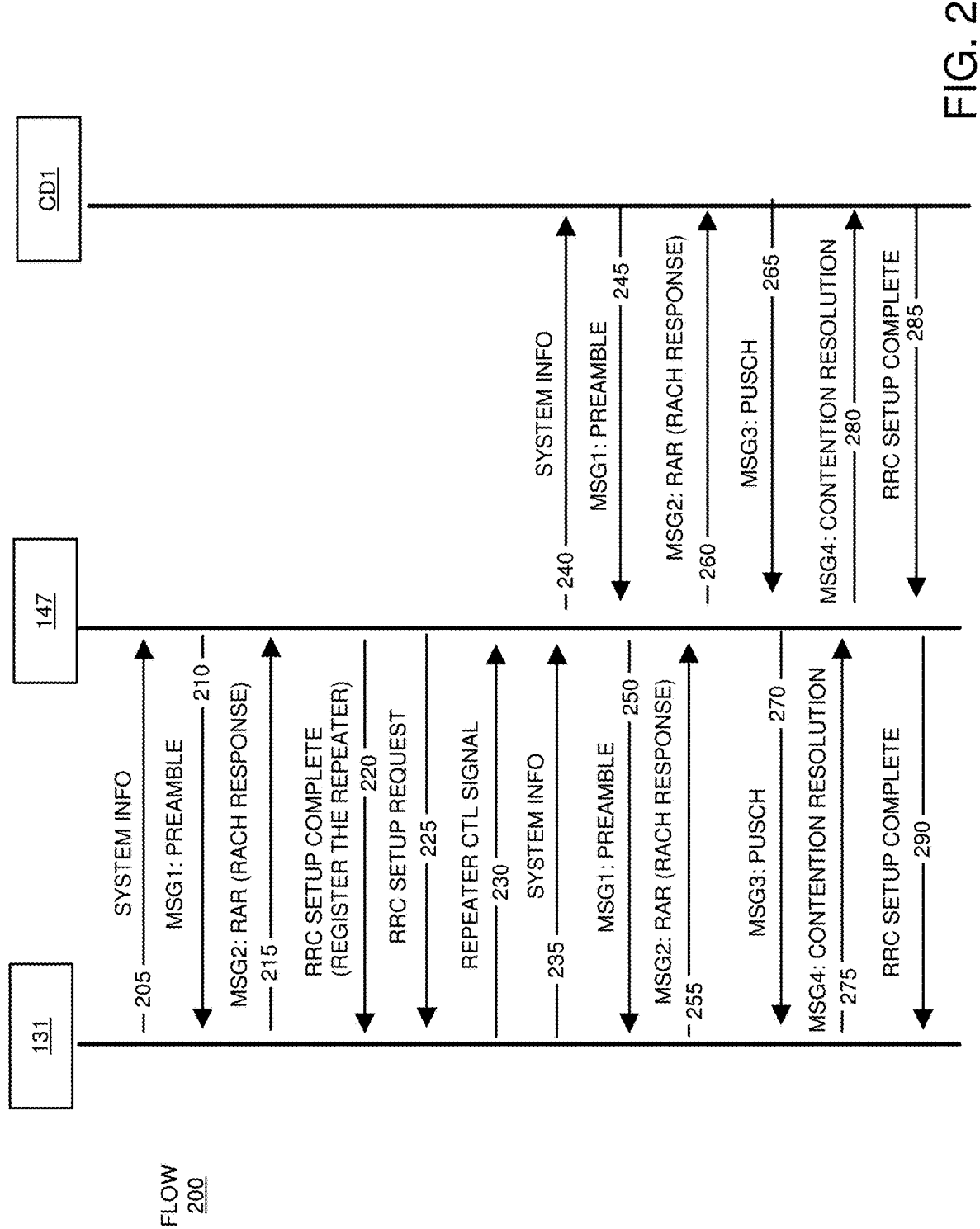

REPEATERS, WIRELESS INTERFERENCE MANAGEMENT, AND BEAMFORMING CONTROL IN A WIRELESS NETWORK

RELATED APPLICATION

This application claims the benefit of earlier filed U.S. Provisional Patent Application Ser. No. 63/336,260 entitled "REPEATERS AND BEAMFORMING CONTROL IN A WIRELESS NETWORK," filed on Apr. 28, 2022, the entire teachings of which are incorporated herein by this reference.

BACKGROUND

Mobile operators have used relays or repeaters to increase the coverage of their cellular networks. These relays or repeaters are typically transparent to UEs (user equipment). Traditionally repeaters are of an "Amplify and Forward" type, which means they amplify a signal received its input before transmitting it forward.

These simple repeaters may cause problems in a respective network as they amplify a signal received at a respective input including interference and a signal from a wireless base station. To overcome this limitation, conventional wireless systems such as 3GPP in LTE introduced a relay which of a "Decode and Forward" and forward type. For example, the repeater receives and decodes the input signal, applies error correction, and then wirelessly re-transmits the repeated signal forward. This type of relay introduces delays in which delay sensitive traffic may suffer. For NR (New Radio), 3GPP introduced Integrated Access and Backhaul (IAB) nodes for robust coverage and reliable backhaul link. However, these nodes have a complex architecture and are expensive to build.

Conventional 3GPP in NR is introducing Network-controlled repeaters to increase cell coverage but with lower complexity than an IAB node and with less delay than a "Decode and Forward" repeater or relay. In general, this repeater will connect with gNB using antennas called "Donor Antennas" and will connect to the UEs with different antennas called "Service Antennas." These repeaters are transparent to UEs and have similar beamforming capability as a gNB.

Beamforming is a signal processing technique that allows for directional transmission or reception of wireless signals in a wireless communication network. Implementation of directional signals helps to mitigate interference, improve signal-to-interference-noise-ratio (SINR), and increase coverage capacity in a respective network environment.

Conventional beam management is an intensive signal processing procedure that includes beam sweeping, beam measurement, beam determination, and beam reporting. 3GPP has defined different reference and synchronization signals that devices (e.g. UE, IAB nodes, repeaters etc) will monitor and then select an appropriate beam to communicate with gNB or with UEs.

BRIEF DESCRIPTION OF EMBODIMENTS

Embodiments herein include one or more multiple repeater wireless stations to provide improved wireless connectivity with respect to conventional techniques.

For example, as previously discussed, a conventional repeater architecture will typically have a UE (user equipment) or Mobile Termination (MT) portion that will help the donor side of the repeater to connect with the gNB (gNodeb or, generally, a wireless base station) using an appropriate beam using the traditional procedure outlined in 3GPP TS 38.213 [3].

This disclosure includes the observation that is desirable that the service part (side) of the repeater wireless station provides wireless connectivity to one or more UE(s), similar to the functionality of a gNB. One functionality of a repeater wireless station to consider on the service side is beamforming. In order to keep the repeater transparent to UEs, it should generate beams with the SSBs containing the same PSS, SSS and PBCH signals/channels as a donor gNB. In order to enable beam management in the so-called connected mode, the repeater wireless station should also have the same CSI-RS as that of gNB.

In order to keep the complexity less than the Distributed Unit (DU) of an IAB node, the repeater wireless station may not have the complete gNB capability. Replicating gNB's independent beamforming capability at a repeater may require that the PSS and SSS signals are generated independently. That may cause synchronization problems (e.g., frequency and timing problems) for the UE's connected to the gNB through the repeater. Independent beam management may cause the repeater beams to interfere with the gNB beams or with the neighboring networks.

As further discussed herein, one embodiment herein includes generating the same SSB pattern from a repeater wireless station (such as an SSB signal corresponding to the gNB) such that the repeater wireless station is transparent to UEs. In other words, the one or more instances of user equipment receive replica signals from the repeater wireless station and are unaware that they are communicating through a repeater wireless station. Another embodiment herein includes providing control of multiple wireless beams of the repeater wireless station to reduce potential interference in a network environment.

First Embodiments

A network environment includes a wireless base station, a repeater wireless station, and one or more mobile communication devices (a.k.a., user equipment). A communication management resource associated with the wireless base station receives a communication from a repeater wireless station. In response to the communication, the communication management resource establishes a wireless communication link between the wireless base station and the repeater wireless station. For example, the communication management resource associated with the wireless base station communicates beamforming control information from the wireless base station to the repeater wireless station. The beamforming control information controls beamforming functions of the repeater wireless station and corresponding wireless connectivity with a first mobile communication device.

In further example embodiments, a combination of the wireless connectivity (such as between the wireless base station and the repeater wireless station) and the wireless communication link (such as between the repeater wireless station and the first mobile communication device) is operative to convey data communications between the wireless base station and the first mobile communication device.

In still further example embodiments, the beamforming control information communicated to the repeater wireless station specifies multiple wireless beams to establish from the repeater wireless station. In one embodiment, the multiple wireless beams support connectivity of multiple mobile communication devices (including the first mobile communication device) through the repeater wireless station to the wireless base station.

The repeater wireless station can be configured to operate in a similar manner as a user equipment. For example, in one embodiment, the repeater wireless station establishes connectivity with the wireless base station and camps on the wireless base station.

As previously discussed, the wireless base station receives a communication from the repeater wireless station resulting in establishing the wireless communication link between the wireless base station and the first mobile communication device. In one embodiment, the communication received from the repeater wireless station includes an identity of the repeater wireless station. In such an instance, the wireless base station is able to target communications to the repeater wireless station.

In further example embodiments, the wireless base station receives a request from the repeater wireless station to register the repeater wireless station with the wireless base station to support the wireless connectivity. This informs the wireless base station that repeater wireless station performs repeater operations.

Still further example embodiments herein include, via the wireless base station, receiving notification that the repeater wireless station is a repeater device via setting of a flag in an RRCsetupcomplete message received from the repeater wireless station.

As previously discussed, the wireless base station can be configured to communicate beamforming control information to the repeater wireless station to control beamforming functions associated with the repeater wireless station. In one embodiment, the beamforming control information indicates multiple different beams to be supported by the repeater wireless station to provide wireless connectivity to multiple mobile communication devices in the network environment.

During repeater operation, the repeater wireless station receives a first wireless signal from the first mobile communication device in the network environment. The repeater wireless station transmits a replica of the received first wireless signal as a second wireless signal. The wireless base station therefore receives the second wireless signal communicated from the repeater wireless station. In still further embodiments, the wireless base station determines an identity of a wireless beam over which the first mobile communication device communicates the first wireless signal to the repeater wireless station based on one of: i) obtaining the identity from a notification included in the received second wireless signal; ii) receiving a message from the repeater wireless station, the message communicated from the repeater wireless station independent of the second wireless signal; or iii) a time of receiving the second wireless signal from the repeater wireless station. In one embodiment, the wireless base station receives the second wireless signal in a RACH (Random Access Channel) occasion associated with a beam assigned to the repeater wireless station to support the wireless connectivity with the first mobile communication device.

In yet further example embodiments, the beamforming control information communicated from the wireless base station to the repeater wireless station specifies a first wireless beam to establish at the repeater wireless station. In one embodiment, the first mobile communication device communicates a preamble communication to the repeater wireless station to establish wireless connectivity. The repeater wireless station replicates the received preamble as a replica preamble wireless communication transmitted to the wireless base station. The wireless base station receives the replica preamble communication from the repeater wireless station. In response to receiving the replica preamble from the repeater wireless station, the wireless base station communicates a RACH response message to the repeater wireless station. The repeater wireless station transmits a replica of the RACH response message to the first mobile communication device. The first mobile communication device then wirelessly connects to the repeater wireless station.

Second Embodiments

A network environment includes wireless base station, a repeater wireless station, and one or more mobile communication devices (a.k.a., user equipment). The wireless base station monitors wireless power levels at which a first communication device and a second communication device receive wireless signals, the first communication device in communication with a first wireless base station through a repeater wireless station. Based on the monitoring of the wireless power levels, the wireless base station detects wireless interference associated with operation of the repeater wireless station. In response to the detected wireless interference, terminating use of a first wireless beam associated with the repeater wireless station.

In one embodiment, terminating use of the first wireless beam associated with the repeater wireless station includes communicating a control message to the repeater wireless station, the control message notifying the repeater wireless station to terminate use of the first wireless beam. In further example embodiments, terminating use of a first wireless beam results in a handoff of the first mobile communication device from the repeater wireless station. The handoff of the first mobile communication device can be initiated from the repeater wireless station to the first wireless base station in response to the detected wireless interference.

In still further example embodiments, the first mobile communication device resides in a geographical region disposed between the first wireless base station and the repeater wireless station. The repeater wireless station supports multiple wireless beams to communicate with multiple mobile communication devices.

In yet further example embodiments, the wireless base station communicates a reference signal from the wireless base station to the repeater wireless station and the second communication device. The repeater wireless station replicates the reference signal and transmitting the replicated reference signal to the first communication device. The base station receiving a first message. The first message is received from the first communication device though the repeater wireless station. The first message indicates a first power level at which the first communication device received the replicated reference signal. The wireless base station receives a second message, the second message is received from the second communication device. The second message indicates a second power level at which the second communication device received the reference signal.

In yet further example embodiments, the repeater wireless station supports multiple wireless beams to communicate with multiple mobile communication devices in the network environment. Detecting wireless interference in the wireless network environment includes detecting a first wireless beam of the multiple wireless beams causing the interference.

Additionally, or alternatively, detecting the wireless interference includes detecting that the termination of use of the first wireless beam reduces wireless interference associated with a first wireless channel used to communicate over the first wireless beam.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to manage operation of multiple repeater wireless stations, the multiple repeater wireless stations operative to: receive first wireless signals from a wireless base station; transmit second wireless signals from the multiple repeater wireless stations to a mobile communication device, the second wireless signals being reproductions of the first wireless signals; and wherein phase shifts of the second wireless signals are controlled in time via the computer processor hardware such that the second wireless signals received by the mobile communication device are phase aligned.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating a sequence of communications supporting connectivity between a repeater wireless station and a main wireless base station according to embodiments herein.

Figure 1B:
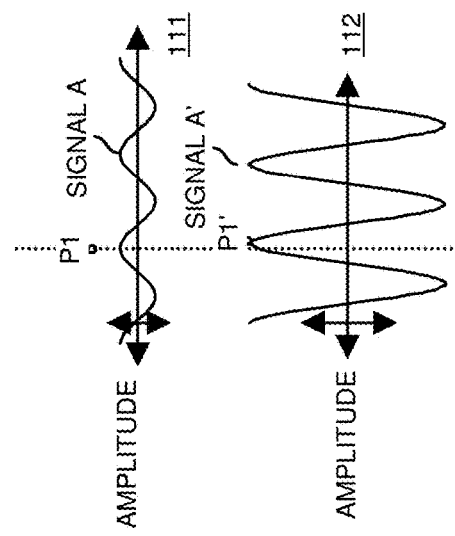
FIG. 1B is an example diagram illustrating an example of replicating a wireless signal according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As further discussed herein, a network environment includes a wireless base station, a repeater wireless station, and one or more mobile communication devices (a.k.a., user equipment). A communication management resource associated with the wireless base station receives a communication from a repeater wireless station. In response to the communication, the communication management resource establishes a wireless communication link between the wireless base station and the repeater wireless station. The communication management resource associated with the wireless base station communicates beamforming control information from the wireless base station to the repeater wireless station. The beamforming control information controls beamforming functions of the repeater wireless station and/or corresponding wireless connectivity with a first mobile communication device.

Figure 1A:
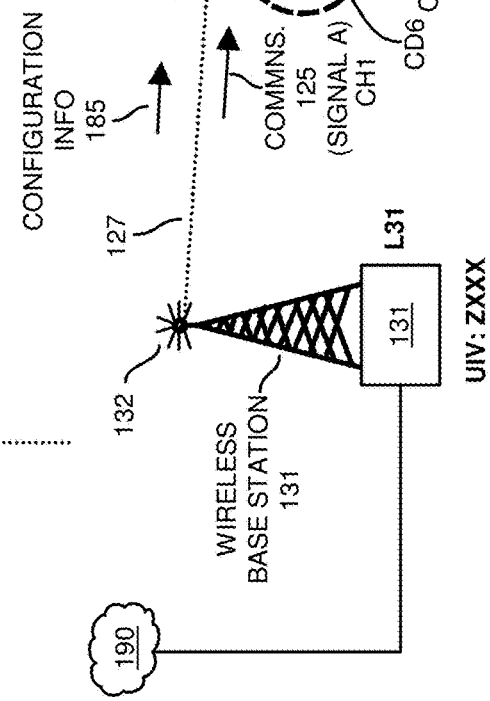
FIG. 1A is an example diagram illustrating a communication network environment and implementation of one or more repeater wireless stations according to embodiments herein.

Now, more specifically, with reference to the drawings, FIG. 1A is an example diagram illustrating a communication network environment and one or more wireless base stations implementing communications according to embodiments herein.

As shown, network environment 100 includes network 190, wireless base station 131, multiple communication devices CD4, CD5, . . . , repeater wireless station 147, and communication devices CD1, CD2, . . . .

Wireless network environment 100 includes any number of wireless base stations and corresponding repeater wireless stations.

In this example embodiment, wireless base station 131 includes a communication management resource to manage transmission and reception of wireless communications in the network environment 100. Repeater wireless station 147 implements communication management resource 147 to manage transmission of wireless communications from the repeater wireless station 147.

Each of the wireless stations wireless base station 131, repeater wireless station 147, etc.) in network environment 100 includes respective one or more instances of antenna hardware to wirelessly communicate with mobile communication devices (a.k.a., user equipment) and/or other wireless stations such as repeater wireless stations. For example, in this embodiment, the wireless base station 131 includes antenna hardware 132 (such as one or more antenna elements, chains of antenna elements, etc.) to transmit communications 125 such as wireless signal A.

Repeater wireless station 147 includes multiple instances of antenna hardware such as first antenna hardware 147-1 to receive the wireless signal A and second antenna hardware 147-2 to communicate wireless signal A'. In one embodiment, the wireless signal A' generated and transmitted from the antenna hardware 147-2 is a replica signal (such as amplified and retransmitted version) of the wireless signal A received by the repeater wireless station 147 over antenna hardware 147-1.

It is noted that each of the wireless base station 131 and repeater wireless station 147 can be configured to support beamforming and directivity of respective wireless signals (such as signal A, signal A', etc.). Alternatively, the antenna hardware associated with the wireless base station 131 and the repeater wireless station 147 support omni-directional communications in the wireless network environment 100.

Note further that each of the resources in network environment 100 can be configured to include or can be configured as appropriate hardware, software, or combination of hardware and software to carry out respective operations as discussed herein.

More specifically, the wireless base station 131 (such as communication management resource) as described herein can be implemented via respective wireless base station hardware, wireless base station software, or a combination of wireless base station hardware and wireless base station software; the repeater wireless station 147 (and corresponding communication management resource) as described herein can be implemented via respective repeater wireless station hardware, repeater wireless station software, or a combination of repeater wireless station hardware and repeater wireless station software; and so on.

As further shown in this example embodiment, the network 190 (such as one or more of Internet, cellular network, private network, etc.) provides connectivity (such as via shared communication link, cable, physical link, wireless link, etc.) to one or more communication devices in the network 190.

The wireless network and corresponding wireless base stations, repeater wireless stations, communication devices, etc., as discussed herein can be configured to support any suitable wireless communication protocols. For example, in one embodiment, each of the wireless stations (i.e., wireless base stations, wireless access points, repeater wireless stations, communication devices, etc.) in network environment 100 can be configured to implement one or more wireless communication protocols such as Wi-Fi™, LTE communications, cellular communications, 4G communications, 5G communications, New Radio (NR), etc.

In still further example embodiments, note that the each of the wireless stations such as wireless base stations, repeater wireless stations, communication devices, etc., can be configured to operate in the CBRS band. For example, in one embodiment, via communications to an allocation management resource in network 190, each of the one or more wireless stations can be configured to register with the allocation management resource (such as a spectrum access system) for allocation of one or more wireless channels to communicate in the network environment 100. In one embodiment, the allocation management resource allocates wireless channel WCH #1 for use by the wireless stations. In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

In further example embodiments, the wireless base station 131 initially registers with an allocation management resource for allocation of one or more wireless channels to support wireless communications in the network environment 100. In further example embodiments, the wireless base station 131 detects or knows of presence of repeater wireless station 147 and communicates wireless control setting information such as beamforming control information 185 (such as including configuration settings) to the repeater wireless station 147.

More specifically, the repeater wireless station 147 (such as RF repeater) can be configured to wirelessly connect to wireless base station 131 and report its location L47 to the wireless base station 131. Alternatively, the wireless base station 131 communicates with an entity that provides location information indicating a location (such as predetermined location L47) of the repeater wireless station 147. In further example embodiments, the wireless base station 131 determines that the repeater wireless station 147 is connected to the wireless base station 131 via receipt of information from the repeater wireless station 147 such as 'UE category' and/or identity information reported by the repeater wireless station 147 to the wireless base station 131.

Subsequent to registration, the allocation management resource (such as a spectrum access system) grants spectrum (such as one or more wireless channels) to the wireless base station 131 and repeater wireless station 147. In one embodiment, the allocation management resource 140 allocates wireless channels from a CBRS band.

As previously discussed, the wireless base station 131 and the repeater wireless station 147 can be configured to communicate over any suitable type of wireless channel and/or wireless communication protocol (cellular wireless communication protocol. Wi-Fi™, etc.

Further in this example embodiment, subsequent to allocation of a respective wireless channel, assume that the wireless base station 131 communicates signal A (such as a downlink signal or communications 125) from antenna hardware 132 in the wireless network environment 100. The wireless signal supports communications with one or more mobile communication devices such as communication device CD4, CD5, CD6, etc. In one embodiment, the repeater wireless station 147 is configured to receive the wireless signal A (communications 125) on antenna hardware 147-1 and then re-transmit the signal A as signal A' to the user equipment CD2 via antenna hardware 147-2.

As shown in FIG. 1B, in this example embodiment, the transmission of wireless signal A' is slightly delayed with respect to the original wireless signal A. In such an instance, the magnitude of the wireless signal A' itself or a combination of the signal A and A' may result in wireless interference.

Note that channel CH1 may be revoked by the allocation management resource if the allocation management resource detects use of the wireless channel CH1 by a higher priority incumbent entity.

Referring again to FIG. 1A, as further discussed herein, the wireless base station 131 can be configured to communicate beamforming control information 185 directly to the repeater wireless station 147. For example, in one embodiment, the repeater wireless station 147 supports connectivity to the wireless base station 131 similar to any of the communication devices CD4, CD5, CD6, etc. The repeater wireless station 147 receives the beamforming control information 185 as control information sent directly to the repeater wireless station 147 and not for retransmission to other communication devices as a repeated signal.

As its name suggests, the beamforming control information 185 controls which of one or more beams generated by the wireless base station 131 to the repeater wireless station 147 are to be repeated by the repeater wireless station to the communication devices CD1 and CD2.

FIG. 2 is an example diagram illustrating a sequence of communications supporting initial registration of a repeater wireless station with a main wireless base station and setup associated with establishment of connectivity between the main wireless base station and one or more communication devices through the repeater wireless station according to embodiments herein.

For example, via communications 205 (such as including system information associated with the wireless network supported by the wireless base station 131 such as a gNodeB), the wireless base station 131 notifies the repeater wireless station 147 of its presence and supporting wireless connectivity such as beamforming as discussed herein.

The repeater wireless station 147 decides to connect to the wireless base station 131 to support a repeater mode as discussed herein. As further shown, via communications 210 from the antenna hardware 147-1 (donor side of the repeater wireless station 147) to the wireless base station 131, the repeater wireless station 147 performs an initial access attempt with the wireless base station 131. In one implementation, the communications 210 include a message 1 preamble communicated in a RACH paging occasion assigned to the repeater wireless station 147 to request connectivity with the wireless base station 131. The repeater wireless station 147 has the ability to request wireless connectivity with the wireless base station 131 similar to other communication devices CD4, CD5, CD6, etc. Thus, in one embodiment, the repeater wireless station 131 operates in a similar manner (such as same protocol) as a mobile communication device or user equipment (such as communication devices CD4, CD5, CD6, etc.) to establish wireless connectivity with the wireless base station 131.

As further discussed herein, note that the wireless base station 131 can be configured to support multiple wireless beams in different directions in the network environment 100. The repeater wireless station 147 (or so-called mobile termination portion of the repeater wireless station) can be configured to camp on the donor wireless base station 131 via one or more wireless beams from the wireless base station 131 that are deemed as the best wireless beams providing the best signal quality from the wireless base station 131 to the repeater wireless station 147.

In further example embodiments, in response to receiving the communications 210, via communications 215 (such as message 2 or RACH response in a RACH protocol) from the wireless base station 131 to the repeater wireless station 147, the wireless base station 131 communicates an RAR (Random Access Response) message to the repeater wireless station 147. In one embodiment, the communications 215 include assignment of uplink resources to the repeater wireless station 147 so that the repeater wireless station 147 is able to communicate in the uplink to the wireless base station 131.

In response to receiving the communications 215 from the wireless base station 131, and in response to setup in accordance with the communications 215, the repeater wireless station 147 generates a respective RRC set up complete message in communications 220 to the wireless base station 131. In one embodiment, the communications 220 include a confirmation of successful completion of an RRC connection establishment. In further example embodiments, the communications from the repeater wireless station 147 include an identity of the repeater wireless station 147, In such an instance, the repeater wireless station 147 identifies/registers with the wireless base station 131 as a "Repeater Node." Thus, the wireless base station 131 knows that the repeater wireless station 147 is available to provide repeater functionality downstream to further communication devices. Registration of the repeater wireless station 147 can be implemented in any suitable manner. For example, in one embodiment, the repeater wireless station 147 communicates its identity (such as unique identifier value indicating the identity of the repeater wireless station 147) or registers with the wireless base station 131 via setting of one or more data bits in the communications 220:

```
   such as a flag e.g. in RRCsetupComplete Message
     • RRCSetupComplete-v1810-IEs :: SEQUENCE {
        • Rep-NodeIndication-r18     ENUMERATED {true}
   }
```

In further example embodiments, via further communications 225, the repeater wireless station 147 can be configured to identify itself or register itself with the wireless base station 131 as a "Repeater Node." This can be achieved in any suitable manner. For example, in one embodiment, the repeater wireless station 147 communicates an RRC-setup request message in the communications 225 to the wireless base station 131. As a more specific example, the repeater wireless station 147 may send a signal e.g. RRC-SetupRequest to the wireless base station 131 such as including:

```
  • RRCSetupRequest-Ies :: = SEQUENCE {
    • rep-Identity            InitialRepeater-identity
    • EstablishmentCause :: =   SSB set up or beam set up or
      Service set
      up
}
```

Thus, via communications 225 (such as an SSB setup request from the repeater wireless station 147 for beamforming control), the wireless base station 131 learns from the repeater wireless station 147 that the repeater wireless station 147 is programmable or controllable to support SSB beam setup. In such an instance, the wireless base station 131 is able to control which of multiple different SSB beams communicated by the wireless base station 131 are to be repeated by the repeater wireless station 147. As further discussed herein, beamforming control information 185 generated by the wireless base station 131 or other suitable entity controls beamforming and beam repeating by the repeater wireless station 147.

Via further communications 230, the wireless base station 131 wirelessly responds to the RRCReqMsg (communications 225) via communication with a repeater control signal (including repeater control information or beamforming control information 185) to the repeater wireless station 147. This can be achieved in any suitable manner. For example, in one embodiment, in response to receiving communications 225 such as including RRCSetupRequest, the wireless base station 131 transmits a repeater specific control signal information (such as in beamforming control information 185) including one or more of:

For each wireless beam to be repeated, the specific PSS/SSS signals (Primary Synchronization Signal/Secondary Synchronization Signal, which is linked to the cell identity group and the cell identity within the group) and PBCH (Physical Broadcast Channel) signals that repeater wireless station 147 is to replicate and wirelessly transmit as outbound wireless beams from the repeater wireless station 147 to other communication devices not necessarily within wireless range of the wireless base station 131.

The SSB (Synchronization Signal Block) indices corresponding to the wireless beams generated by the wireless base station 131 and received by the repeater wireless station 147 that the repeater wireless station 147 needs to generate as a repeated wireless beam in the network environment 100. In one embodiment, the SSB index corresponds with a specific beam that is the same (repeat) of the wireless beam from the wireless base station 131. In other words, each SSB index indicates a corresponding wireless beam transmitted by the wireless base station 131 that is to be repeated by the repeater wireless station 147. Each SSB index indicates a beam.

In one embodiment, Rach Occasions and preamble association with SSB should be same as in gNB i.e. same FDM mapping and ssb-perRACH-OccasionAndCB-PreamblesPerSSB as in gNB. This ensures that any communication devices that receive repeated wireless signals from the wireless base station 131 through the repeater wireless station 147 in a downlink direction are able to respond through the repeater wireless station 147 to the wireless base station 131 in the uplink direction.

Note that the above procedure will enable the repeater wireless station 147 to transmit the same SSB information from respective wireless beams as the wireless base station 131 (such as gNB) in the network, which will make the repeater wireless station 147 transparent to all UEs (such as communication devices CD1, CD2, etc.) connecting to it. In other words, the repeater wireless station 147 knows which of the wireless beams from the wireless base station 131 are to be repeated by the repeater wireless station 147. The repeated beams from the repeater wireless station 147 appear to any communication devices (such as CD1, CD2) as being transmitted by the wireless base station 131. All the UEs performing initial access will be passed by the repeater wireless station 147 to the wireless base station 131, which can be configured to respond according to a wireless communication protocol such as 3GPP TS 38.213 procedures [3].

As a more specific example, via communications 235, the wireless base station 131 communicates system information about itself and availability of supporting wireless communications to the repeater wireless station 147. The repeater wireless station 147 receives the communications 235 from the wireless base station 131 using the antenna hardware 147-1. As previously discussed, the repeater wireless station 147 duplicates or replicates the received wireless signal (communications 235) from the wireless base station 131 and transmits it as communications 240. Via communications 240 from antenna hardware 147-2, such as the duplicated wireless signal (same as the received wireless signal but amplified in power), the repeater wireless station 147 communicates the duplicated signal as communications 240 (notification system information and availability) to one or more instances of user equipment in the network environment 100.

Assume in this example embodiment that the communication device CD1 receives the communications 240 transmitted from the repeater wireless station 147 over antenna hardware 147-2. In response to a user of the communication device CD1 attempting to or desiring to establish connectivity with the remote network 190, the communication device CD1 transmits wireless communications 245 such as including a respective preamble in a PRACH paging occasion assigned to the communication device CD1 in the uplink to the antenna hardware 147-2 of the repeater wireless station 147. As further shown, the repeater wireless station 147 therefore receives the preamble of communications 245, and then duplicates and retransmits the received communications 245 as wireless communications 250 from antenna hardware 147-1 to the wireless base station 131. Accordingly, the wireless base station 131 receives the preamble in an appropriate paging occasion from the communication device CD1 requesting to establish a new wireless communication link.

In response to receiving the communications 250 from the receiver wireless station 147, the wireless base station 131 transmits wireless communications 255 to antenna hardware 147-1 of the repeater wireless station 147. In one embodiment, the wireless communications 255 include a RACH response message (such as an RAR message—PDCCH/PDSCH) transmitted to the repeater wireless station 147. As further shown, the repeater wireless station 147 receives the wireless communications 255, and then duplicates and retransmits the received communications 255 as wireless communications 260 to the communication device CD1. Accordingly, the repeater wireless station 147 receives the RACH response message in communications 255 from the wireless base station 131 and communicates it as communications 260 to the communication device CD1 requesting the new wireless communication link. It appears to the communication device CD1 that the communications 260 were transmitted by the wireless base station 131.

Assume further in this example embodiment that the communication device CD1 receives the communications 260 transmitted from the repeater wireless station 147 over antenna hardware 147-2. In response to these communications 260, the communication device CD1 transmits wireless communications 265 such as including a respective PUSCH (Physical Uplink Shared Channel) message 3 to the antenna hardware 147-2 of the repeater wireless station 147. As further shown, the repeater wireless station 147 therefore receives the PUSCH message, and then duplicates and retransmits the received communications 265 as wireless communications 270 from antenna hardware 147-1 to the wireless base station 131. Accordingly, the wireless base station 131 receives the PUSCH message 3 from the communication device CD1 requesting to establish the new wireless communication link.

In response to receiving the communications 270 from the receiver wireless station 147, the wireless base station 131 transmits wireless communications 275 to antenna hardware 147-1 of the repeater wireless station 147. In one embodiment, the wireless communications 275 include contention resolution message 4 transmitted to the repeater wireless station 147. As further shown, the repeater wireless station 147 receives the wireless communications 275, and then duplicates and retransmits the received communications 275 as wireless communications 280 to the communication device CD1. Accordingly, the repeater wireless station 147 receives the contention resolution message 4 message from the wireless base station 131 and communicates it to the communication device CD1 requesting the new wireless communication link. In a similar manner as previously discussed, it appears to the communication device CD1 that the communications 280 were transmitted by the wireless base station 131 even though they were transmitted from the repeater wireless station 147.

Yet further in this example embodiment, the communication device CD1 thus receives the communications 280 transmitted from the repeater wireless station 147 over antenna hardware 147-2. In response to these communications 280, the communication device CD1 transmits wireless communications 285 such as including a respective RRC Setup Complete message to the antenna hardware 147-2 of the repeater wireless station 147. As further shown, the repeater wireless station 147 therefore receives the respective RRC Setup Complete message, and then duplicates and retransmits the received communications 285 as wireless communications 290 from antenna hardware 147-1 to the wireless base station 131. Accordingly, the wireless base station 131 receives the respective RRC Setup Complete message from the communication device CD1.

Via further communications 295 and 297 in the downlink direction from the wireless base station 131, the wireless base station 131 communicates through the repeater wireless station 147 to the communication device CD1. Conversely, in the uplink direction from the communication device CD1, via communications 297 and 295, the communication device CD1 communicates through the repeater wireless station 147 to the wireless base station 131.

Figure 3:
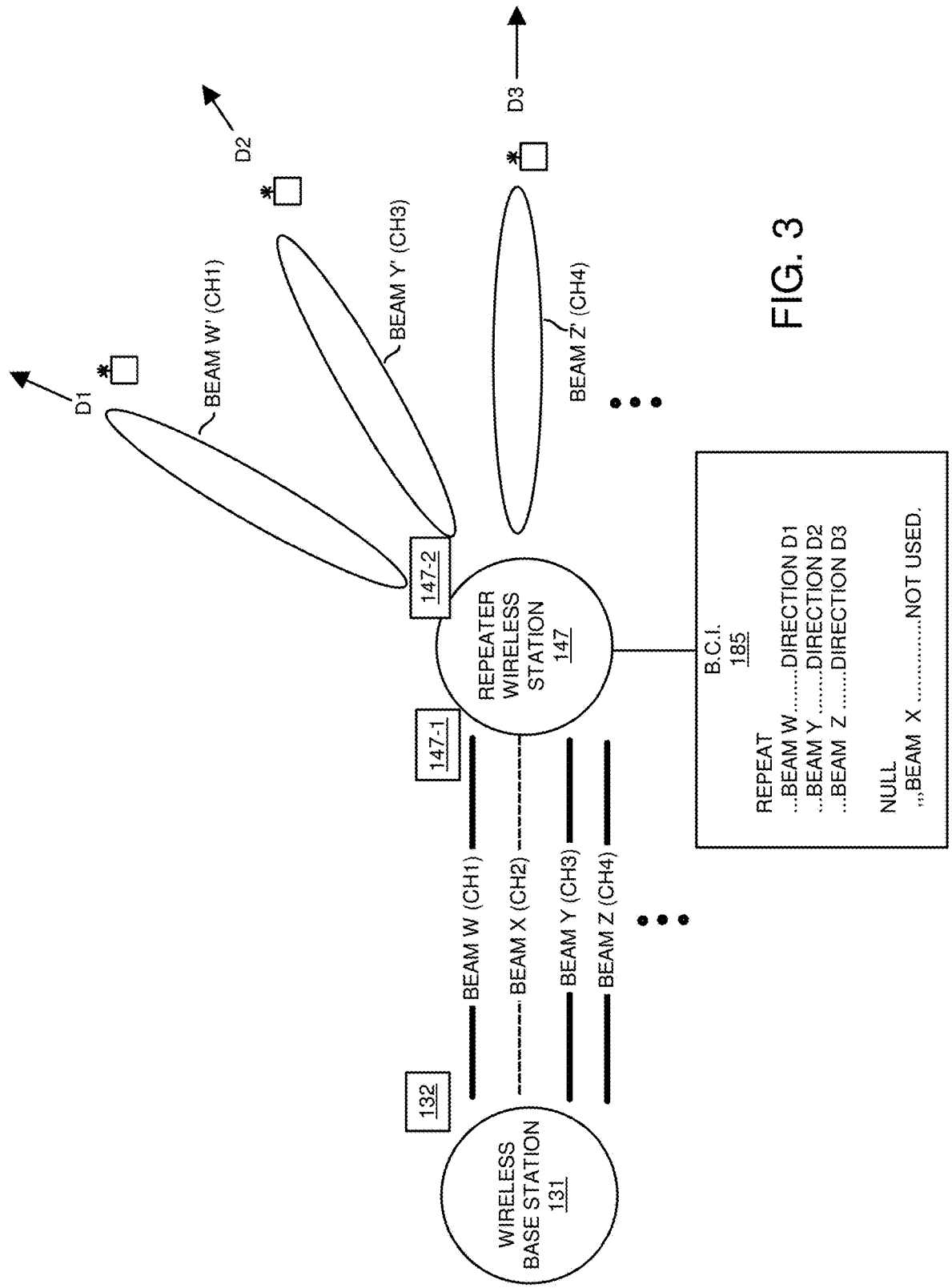
FIG. 3 is an example diagram illustrating frequency division of repeated wireless beams from a repeater wireless station according to embodiments herein.

FIG. 3 is an example diagram illustrating frequency division of repeated wireless beams from a repeater wireless station according to embodiments herein.

In this example embodiment, the beamforming control information 185 controls the repeater wireless station 147 to repeat wireless beam W (CH1), beam Y (CH3), and beam Z (CH4). The beamforming control information indicates not to retransmit wireless beam X (CH2).

Each of the channels can be configured to support uplink and downlink communications at different times. According to the same schedule information, the repeater wireless station 147 repeats signals received from the wireless base station for downlink portions of the time-division duplex schedule. Conversely, the repeater wireless station 147 repeats signals received from the mobile communication devices and transmits them to the wireless base station 131 for uplink portions of the time-division duplex schedule.

If desired, via the beamforming control information 185, the repeater wireless station 147 can be configured to establish each of the beams in a specified direction from the repeater wireless station 147. For example, the wireless base station or other suitable entity can be configured to control the direction of wireless beams from the repeater wireless station supporting downlink and uplink communications. In this example embodiment, the control information 185 from the repeater wireless station 147 indicates to support wireless beam W' in direction D1; the control information 185 from the repeater wireless station 147 indicates to support wireless beam Y' in direction D2; the control information 185 from the repeater wireless station 147 indicates to support wireless beam Z' in direction D3; and so on.

In accordance with the beamforming control information 185, during downlink schedule timeslots, the repeater wireless station 147 monitors a wireless signal (communications) from the wireless base station 131 over wireless beam W and wireless channel CH1 and retransmits the received signals over beam W' (CH1) (in a specified direction D1 as indicated by the beamforming control information) to one or more mobile communication devices. In a reverse direction, during uplink schedule timeslots, the repeater wireless station 147 receives one or more wireless signals from mobile communication devices via beam W' (CH1) and retransmits those received signals over a respective wireless beam to wireless beam W associated with the wireless base station 131.

In accordance with the beamforming control information 185, the repeater wireless station 147 monitors a wireless signal (communications) from the wireless base station 131 over wireless beam Y and wireless channel CH3 and retransmits the received signals over beam Y' (CH3) (in a specified direction as indicated by the beamforming control information) to one or more mobile communication devices. In a reverse direction, the repeater wireless station 147 receives one or more wireless signals from mobile communication devices via beam Y' (CH3) and retransmits those received signals over a respective wireless beam to wireless beam Y associated with the wireless base station 131.

In accordance with the beamforming control information 185, the repeater wireless station 147 monitors a wireless signal (communications) from the wireless base station 131 over wireless beam Z and wireless channel CH4 and retransmits the received signals over beam Z' (CH4) (in a specified direction as indicated by the beamforming control information) to one or more mobile communication devices. In a reverse direction, the repeater wireless station 147 receives one or more wireless signals from mobile communication devices via beam Z' (CH4) and retransmits those received signals over a respective wireless beam to wireless beam Z associated with the wireless base station 131.

Because the beams are spaced in frequency (CH1, CH3, CH4, etc.), the repeater wireless station 147 can be configured to simultaneously receive wireless communications from the wireless base station 131 on the different wireless channels and retransmit in different wireless beams to respective one or more mobile communication device. Also, because the beams are spaced in frequency (CH1, CH3, CH4, etc.), the repeater wireless station 147 can be configured to simultaneously receive wireless communications from the downstream mobile communication devices on the different wireless channels (wireless beams) and retransmit those signals in different wireless beams to the respective wireless base station 131.

FIGS. 4A, 4B, 4C, and 4D are example diagrams illustrating time division multiplexing of a repeated wireless beam from a repeater wireless station according to embodiments herein.

In this example embodiment, the repeater wireless station 147 implements time-division multiplexing of wireless beams to provide repeater wireless connectivity in different directions.

Figure 4A:
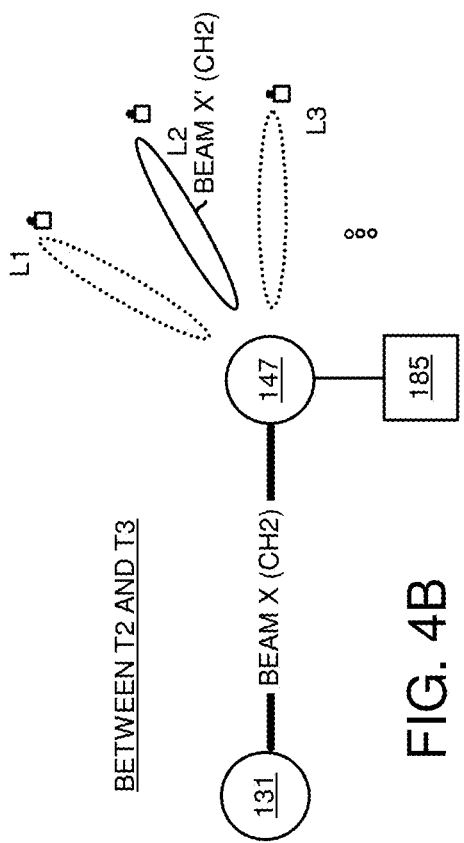
FIGS. 4A, 4B, 4C, and 4D are example diagrams illustrating time division multiplexing of a repeated wireless beam from a repeater wireless station according to embodiments herein.

For example, in FIG. 4A, during first downlink timeslots or time duration between time T1 and time T2 of a communication schedule, the repeater wireless station 147 repeats wireless beam W (such as based on channel CH1) in a first direction to communication devices at location L1; in a reverse direction, in uplink timeslots, the repeater wireless station 147 receives signals via wireless beam W' (such as based on channel CH1) and retransmits the received wireless signal to the wireless base station 131. Thus, wireless base station 131 receives the repeated wireless signals via the wireless beam W.

Figure 4B:
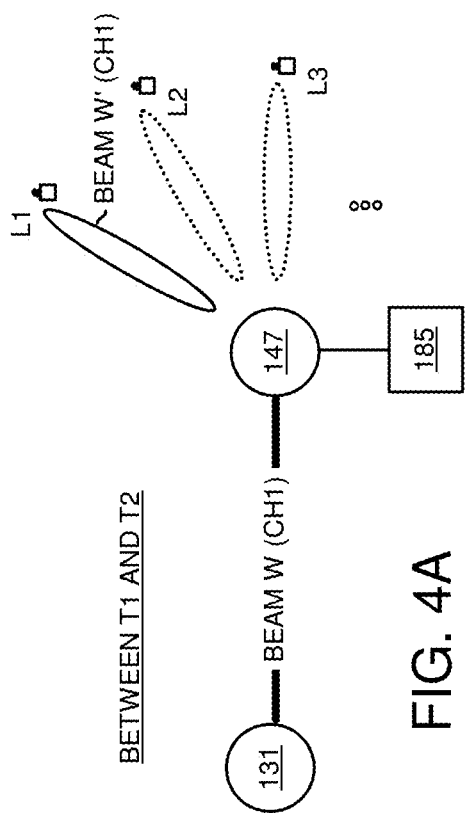

In FIG. 4B, during second downlink timeslots or time duration between time T2 and time T3 of a communication schedule, the repeater wireless station 147 repeats wireless beam X (such as based on channel CH1) in a second direction to communication devices at location L2; in a reverse direction, in uplink timeslots the repeater wireless station 147 receives signals via wireless beam X' (such as based on channel CH1) and retransmits the received wireless signal to the wireless base station 131. Thus, wireless base station 131 receives the repeated wireless signals from the repeater wireless station via the wireless beam X.

Figure 4C:
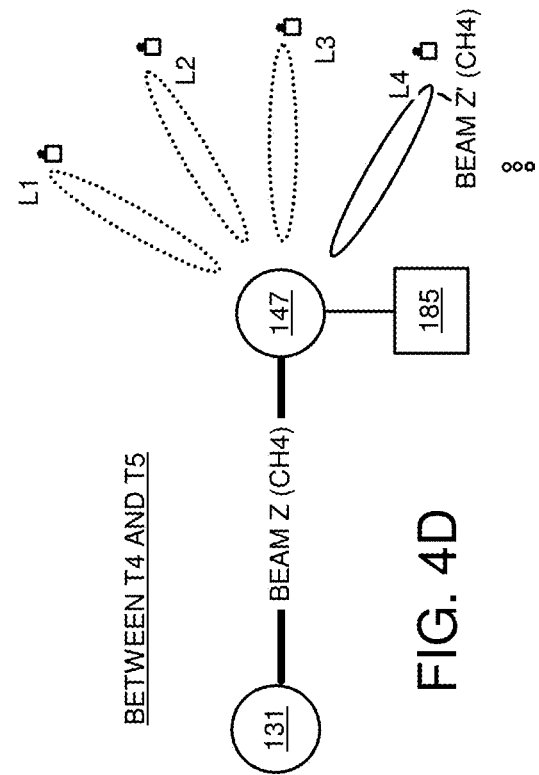

In FIG. 4C, during third downlink timeslots or time duration between time T3 and time T4, the repeater wireless station 147 repeats wireless beam Y (such as based on channel CH1) in a third direction to communication devices at location L3; in a reverse direction, during allocated uplink timeslots, the repeater wireless station 147 receives signals via wireless beam Y' (such as based on channel CH1) and retransmits the received wireless signal to the wireless base station 131. Thus, wireless base station 131 receives the repeated wireless signals from the repeater wireless station via the wireless beam Y.

Figure 4D:
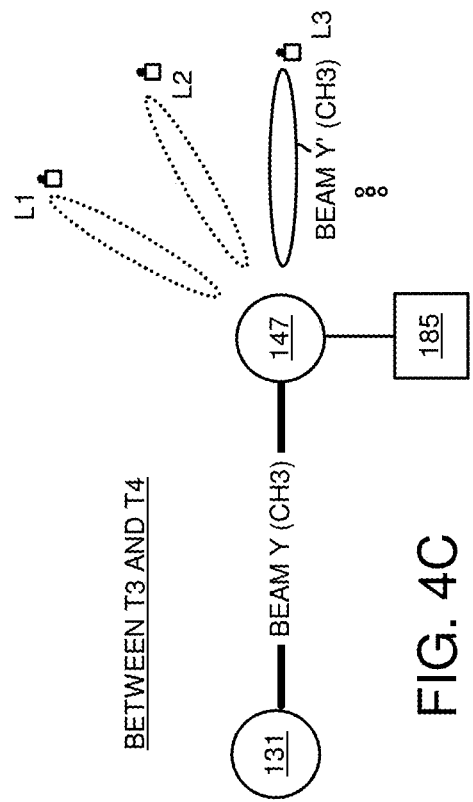

In FIG. 4D, during a fourth timeslot or time duration between time T4 and time T5, the repeater wireless station 147 repeats wireless beam Z (such as based on channel CH1) in a third direction to communication devices at location L4; in a reverse direction, during allocated uplink timeslots, the repeater wireless station 147 receives signals via wireless beam Z' (such as based on channel CH1) and retransmits the received wireless signal to the wireless base station 131. Thus, wireless base station 131 receives the repeated wireless signals from the repeater wireless station via the wireless beam Z.

Figure 5A:
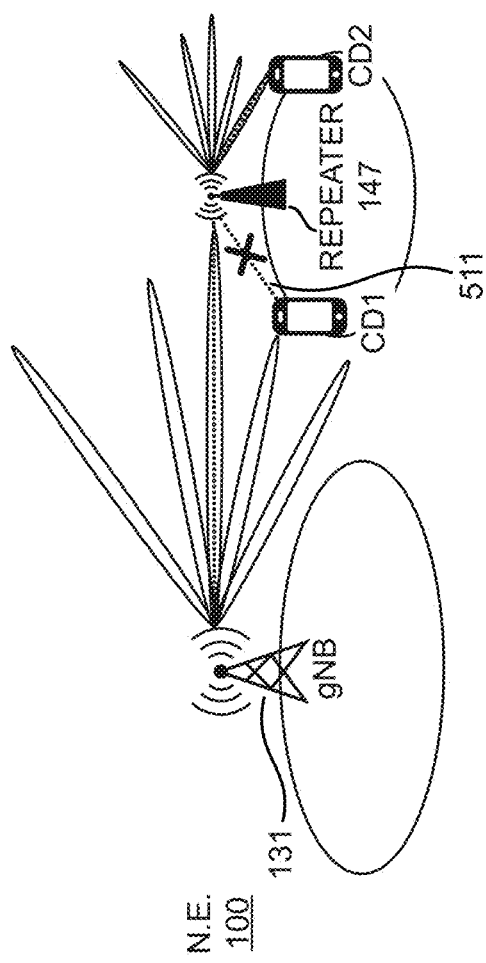
FIGS. 5A and 5B are example diagrams illustrating control of one or more wireless beams from a repeater wireless station to reduce interference according to embodiments herein.
Figure 5B:
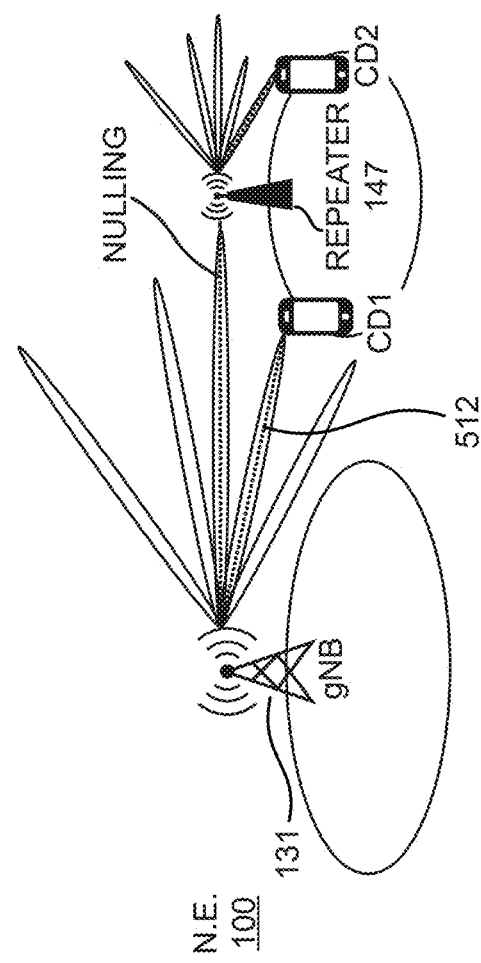

FIGS. 5A and 5B are example diagrams illustrating control of one or more wireless beams from a repeater wireless station to reduce interference according to embodiments herein.

In general, as shown in FIG. 5A, the wireless base station 131 communicates signals to repeater wireless station 147. The repeater wireless station 147 retransmits those received signals to the communication device CD1. The wireless base station 131 monitors the network environment 100 for interference. In response to detecting interference caused by the communications between the communication device CD1 and the wireless base station 147, the repeater wireless station controls the repeater wireless station 147 to discontinue providing communications to the communication device CD1. The communication device CD1 is handed off to the wireless base station 131 as shown in FIG. 5B.

Beamforming Information

To take advantage of NR (New Radio) or other beamforming functionality, the beamforming capability of the repeater wireless station 147 as discussed herein is controlled by the network (such as a communication management resource associated with the wireless base station 131). In such an instance, the network-controlled repeater wireless stations in the network environment 100 will enable a particular beam (copy of a beam from the wireless base station 131) only if the repeater wireless station 147 receives the corresponding beam SSB signal from wireless base station 131 (such as gNB) as a beam to repeat. For example, via the beamforming control information (or other suitable information), the wireless base station 131 controls operation of the repeater wireless station 147 and which of one or more wireless beams associated with the wireless base station are to be replicated by the repeater wireless station 147.

Note that side control information (such as beamforming control information 185) can be used to inform the network-controlled repeater wireless station 147 regarding the SSB indices (i.e., wireless beam identities) corresponding to beams that repeater wireless station is to enable for broadcast signaling. As previously discussed, note that RACH occasions and preamble association with the SSBs (different wireless beams) will be the same as that used in the gNB.

As previously discussed, by controlling beam forming of the repeater wireless station 147 via the wireless base station 131 and corresponding beamforming control information 185, the wireless base station 131 (or other suitable entity) is able null or terminate the different wireless beams from the repeater wireless station 147 that are detected as causing interference to other networks (wireless devices and corresponding links) in the network environment 100.

Note that the control information to null or terminate wireless beam can be part of the side control information that gNB sends to the repeater by not sending the SSB index of the beam causing interference.

As previously discussed, FIG. 5A illustrates a wireless base station 131 allocating one or more wireless beams that are to be repeated by the repeater wireless station and control of wireless beams used by the repeater wireless station 147. As previously discussed, FIG. 5A illustrates detection of caused by a wireless beam transmitted by the repeater wireless station 147. FIG. 5B illustrates termination of the repeater wireless station 147 transmitting a wireless beam that causes the detected interference.

In further example embodiments, in order to maintain the simultaneous backhaul and access link between the wireless base station 131 and the repeater wireless station 147, one embodiment herein include providing sufficient separation between the donor antenna(s) (such as antenna hardware 147-1) and service antenna(s) (such as antenna hardware 147-2) of the repeater wireless station 147.

Note that even with a physical spatial separation of antenna hardware 147-1 and antenna hardware 147-2, it is possible that the service antenna beams (from antenna hardware 147-2) interfere with the backhaul beams (from antenna hardware of the wireless base station 131). More specifically, as shown in FIG. 5A, wireless interference can be caused by the wireless beam from the wireless base station 131 (backhaul or wireless communication link between the wireless base station 131 and repeater wireless station 147) serving the repeater wireless station 147 and the wireless beam 512 from the repeater serving the one or more UEs (such as including communication device CD1).

Embodiments herein include nulling the wireless beam 512 from the repeater wireless station 147. In one embodiment, the information for nulling a particular beam is communicated by the wireless base station 131 in corresponding side control information from the wireless base station 131. Before nulling any beams from the repeater wireless station 147, the wireless base station 131 can be configured to instructs the communication device CD1 to reorient its beams towards the wireless base station 131 such that the CD1 is served by the wireless base station 131 instead of the repeater wireless station 147. This is effectively a handoff of the communication device CD1 from the repeater wireless station 147 to the wireless base station 131.

In further example embodiments, note that the wireless base station 131 may not notify the communication device CD1 to re-orient its wireless connectivity to the wireless base station 131. In such an instance, in response to the dropped wireless beam from the repeater wireless station 147 to the communication device CD1, the communication device CD1 detects the dropped link and executes a beam failure procedure, which searches for any available wireless base station in which to establish a new wireless communication link and access remote network 190. The handoff to the new wireless base station may occur before the communication device CD1 declaring a Radio Link Failure (RLF).

Thus, embodiments herein include the wireless base station 131 controlling beamforming of the repeater wireless station 147. Other embodiments herein include wireless beam termination during certain network conditions.

Information on UL-DL TDD Configuration

In further example embodiments, the network-controlled repeater wireless station 147 is able to decode common SIB information to determine respective UL-DL TDD configurations. This will aid the repeater wireless stations to align the Tx-Rx switching in the backhaul or access directions to transmit or receive the data without causing interference to the donor (wireless base station 131) and neighboring nodes in the network environment 100. The repeater wireless station 147 can be configured to support decoding the common control information (beamforming control information 185) as well as support flexible TDD (time-division duplex) patterns that are aligned with the donor wireless base station 131 (gNB).

It is desirable to support the dedicated (UE specific) TDD patterns. Following two options can be considered to support UE specific TDD patterns. For example, according to a first option, do not support dedicated TDD patterns through repeaters (limiting the deployment). According to a second option, embodiments herein include adding repeater specific control signaling to indicate UE specific dedicated TDD patterns.

In further example embodiments, embodiments herein include adding UE specific TDD pattern as side control information towards the repeater to avoid limiting the deployment.

Synchronization

Further embodiments herein include aligning uplink transmission with the wireless base station's (gNB's) UL (uplink) reception to avoid interference in the UL direction. For example, the gNB (wireless base station 131) can be configured to control the UL transmission by means of Timing Advance (TA) commands to the UE. One issue is the alignment of UEs Tx/Rx boundaries connected to the repeater wireless station 147. One possible solution is, if the processing delay involved at the repeater is very small such as within the guard period at the UE, then there is no concern in sending the TA commands to the UE served by the repeater wireless station 147. However, another concern is when the processing delay is greater than the guard period. To address this, embodiments herein can include the gNB including additional processing delay caused by the repeater in the TA command.

Network-controlled repeaters could also have a max processing delay defined based on the deployment scenario. The wireless base station (gNB) uses that information to adjust the TA toward the UE for aligning UL transmission and reception boundaries. This can also be obtained if there is some side control information added from the repeater wireless station 147 to gNB to inform the gNB about the maximum processing delay through it. The maximum processing delay could also be decided based on the classes of the repeater.

In one embodiment, repeaters having processing delay greater than a predetermined delay should report the delay to the gNB so the gNB can consider it for its signaling of TA commands to the UEs.

Interference Management and Energy Efficiency

One of the main requirements for a network-controlled repeater may be energy efficiency. To fulfil such a requirement, the repeater may need the capability to be turned ON/OFF. This mechanism could be controlled by the network (gNB) based on the density of the communication device traffic. If the area served by the network-controlled repeater wireless station is experiencing low to no traffic, the repeater wireless station can be turned OFF (i.e., not retransmit any wireless beams) to save energy and avoid interference.

In one embodiment, the repeater wireless station 147 includes supports ON/OFF capability that is controlled by the gNB through the side control information (such as beamforming control information 185).

In a dense network, repeaters could cause interference to the neighboring networks. In this scenario, the capability of turning the repeaters ON/OFF helps mitigate the interference. RAN1 can specify measurements required by the gNB to make the decision if the repeater is causing interference.

Turning the repeater OFF to mitigate interference will limit the coverage. One solution would be for the gNB to have the power control capability of the repeater in backhaul (donor) as well as in access (service) links.

Figure 6:
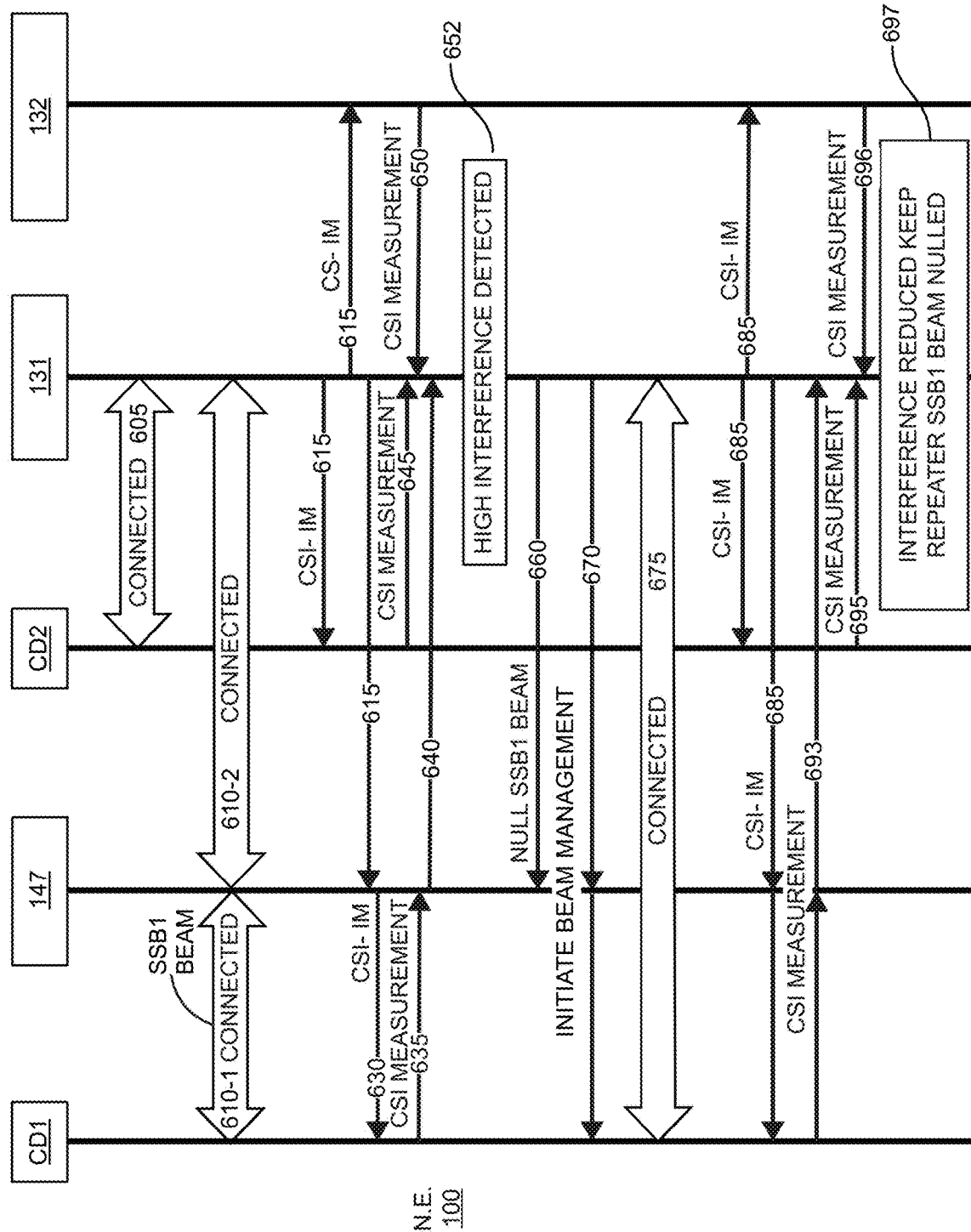
FIG. 6 is an example diagram illustrating flow control of signals associated with management of wireless beams according to embodiments herein.

FIG. 6 is an example diagram illustrating flow control of signals associated with management of wireless beams according to embodiments herein.

The communication device CD2 is in communication with the wireless base station 131 via the wireless communication link 605.

The communication device CD1 is in communication with the wireless base station 131 through the repeater wireless station 147 via the wireless communication link 610-1 and wireless communication link 610-2.

The wireless base station 131 transmits a reference signal 615 to wireless base station 132 (i.e., neighbor wireless base station), communication device CD2, and repeater wireless station 147. The repeater wireless station 147 retransmits the reference signal 615 as reference signal 630.

Each of the different wireless stations such as communication device CD1, repeater wireless station 147, communication device CD 2, and the neighboring wireless base station 132 measures a respective power level of receiving the reference signals.

Based on the measurement of the reference signal 630 received by the communication device CD1, the communication device CD1 communicates power signal information 635 to the repeater wireless station 147. The power signal information 635 indicates a respective wireless power level at which the communication device CD1 received the wireless signal 630. The repeater wireless station 147 retransmits the signal 635 as signal 640 to the wireless base station 131. Thus, the wireless base station 131 determines a respective wireless power level at which the communication device CD1 received the reference signal 630 (replica of reference signal 615).

Based on the measurement of the reference signal 615 received by the communication device CD2, the communication device CD2 communicates power signal information 645 (such as a CSI or Channel State Information measurement) to the wireless base station 131. The power signal information 645 indicates a respective wireless power level at which the communication device CD2 received the wireless signal 615 from the wireless base station 131. Thus, the wireless base station 131 determines a respective wireless power level at which the communication device CD2 received the reference signal 615.

Based on the measurement of the reference signal 615 received by the base station 132, the wireless base station 132 communicates power signal information 650 (such as a CSI or Channel State Information measurement) to the wireless base station 131. The power signal information 645 indicates a respective wireless power level at which the neighbor wireless base station 132 received the wireless signal 615 from the wireless base station 131. Thus, the wireless base station 131 determines a respective wireless power level at which the neighbor wireless base station 132 received the reference signal 615.

In processing operation 652, assume that the wireless base station 131 detects a high level of interference associated with the corresponding channel over which the reference signal 615 was transmitted.

In response to detecting a high level of interference associated with the communication device CD1 receiving the reference signal 630, and to reduce the wireless interference, the wireless base station 131 terminates the SSB1 wireless beam communicated from the repeater wireless station 147. Via further signaling such as communications 670 communicated from the wireless base station 131 to the communication device CD1, the wireless base station notifies the communication device CD1 to wirelessly connect to the wireless base station 131. In response to this condition, the communication device CD1 and the wireless base station 131 establish wireless communication link 675.

The wireless base station 131 then tests whether the termination of using the wireless beam SSB1 produces respective interference in the network environment 100. For example, the wireless base station 131 transmits the reference signal 685. In a similar manner as PC discussed, each of the wireless stations in the network environment 100 monitor a respective power level of receiving the reference signal 685.

Based on the measurement of the reference signal 685 received by the base station 132, the wireless base station 132 communicates power signal information 696 (such as a CSI or Channel State Information measurement) to the wireless base station 131. The power signal information 696 indicates a respective wireless power level at which the neighbor wireless base station 132 received the wireless signal 685 from the wireless base station 131. Thus, the wireless base station 131 determines a respective wireless power level at which the neighbor wireless base station 132 received the reference signal 685.

Based on the measurement of the reference signal 685 received by the communication device CD1, the communication device CD1 communicates power signal information 693 (such as a CSI or Channel State Information measurement) to the wireless base station 131. The power signal information 693 indicates a respective wireless power level at which the communication device CD1 received the wireless signal 685 from the wireless base station 131. Thus, the wireless base station 131 determines a respective wireless power level at which the communication device CD1 received the reference signal 685.

Based on the measurement of the reference signal 685 received by the communication device CD2, the communication device CD2 communicates power signal information 695 (such as a CSI or Channel State Information measurement) to the wireless base station 131. The power signal information 695 indicates a respective wireless power level at which the communication device CD2 received the wireless signal 685 from the wireless base station 131. Thus, the wireless base station 131 determines a respective wireless power level at which the communication device CD2 received the reference signal 685.

In processing operation 657, assume that the wireless base station 131 detects a reduced level of wireless interference associated with the corresponding channel over which the reference signal 685 was transmitted.

In response to detecting a reduced level of wireless interference with respect to processing operation 652, the wireless base station 131 continues to terminate use of the wireless beam SSB1.

Figure 7:
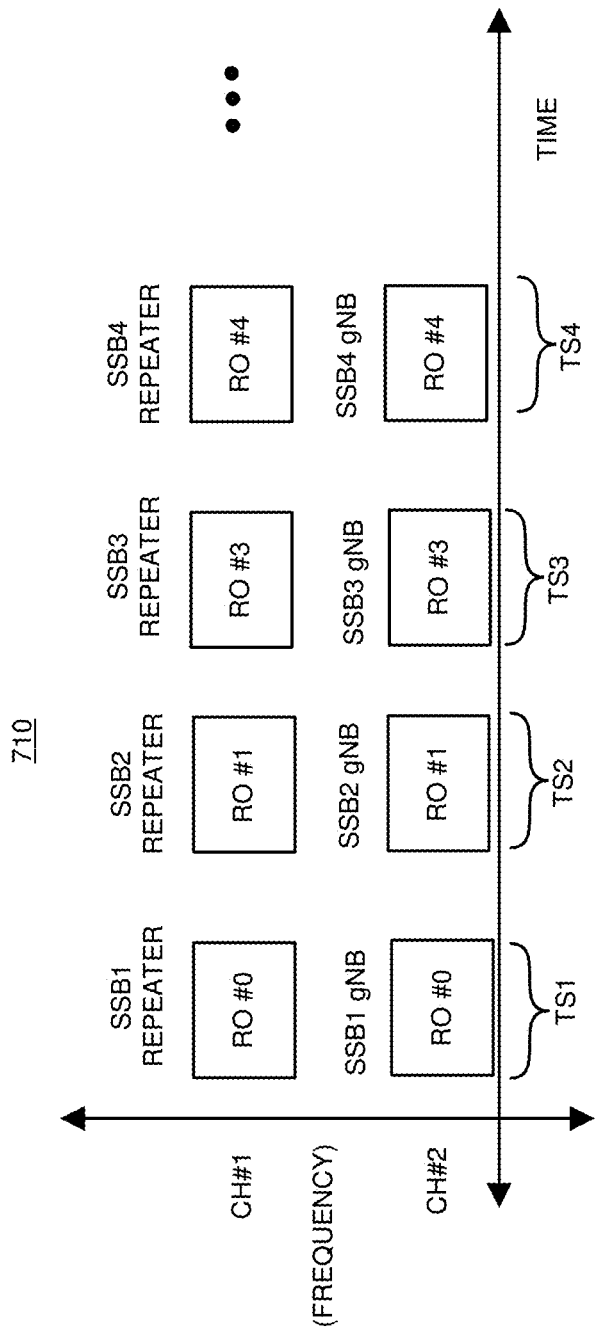
FIG. 7 is an example diagram illustrating the RACH Occasions having different frequency bands between gNB and repeater according to embodiments herein.

FIG. 7 is an example diagram illustrating the RACH Occasions (ROs) having different frequency bands between gNB and repeater according to embodiments herein.

In further example embodiments, the wireless base station 131 (a.k.a., gNB) will identify different frequency bands for the RACH occasions for SSBs that will be broadcasted through the repeater wireless stations.

For example, in timeslot TS1, the wireless base station 131 communicates RO #0 (RACH Occasion #0) in channel CH #1; the repeater wireless station 147 repeats the RO (RACH Occasion #0) in channel CH #2TS1.

In timeslot TS2, the wireless base station 131 communicates RO #1 (RACH Occasion #1) in channel CH #1; the repeater wireless station 147 repeats the RO #1 (RACH Occasion #1) in channel CH #2 in timeslot TS2.

In timeslot TS3, the wireless base station 131 communicates RO #2 (RACH Occasion #2) in channel CH #1; the repeater wireless station 147 repeats the RO #2 (RACH Occasion #2) in channel CH #2 in timeslot TS2.

This way, the wireless base station 131 (gNB) will be able to differentiate the end communication devices (UEs) sending different RACH preambles through the repeaters from the UEs responding to the wireless base stations (gNBs) own transmitted SSB signals. The graph 710 is an example figure showing the ROs (RACH Occasions) having different frequency bands between the wireless base station 131 (gNB) and a respective repeater wireless station.

Further embodiments herein include assigning unique RACH preambles for the SSBs being broadcasted through the wireless base station 131 (gNB). In such an instance, RACH occasions and frequency bands implemented by the repeater wireless stations will remain the same as those implemented by the wireless base station 131 (gNB), but the wireless base station 131 (gNB) will look for distinct PRACH preambles from the repeater wireless station 147 when the wireless base station 131 processes wireless beams connected with a respective repeater wireless station.

Figure 8:
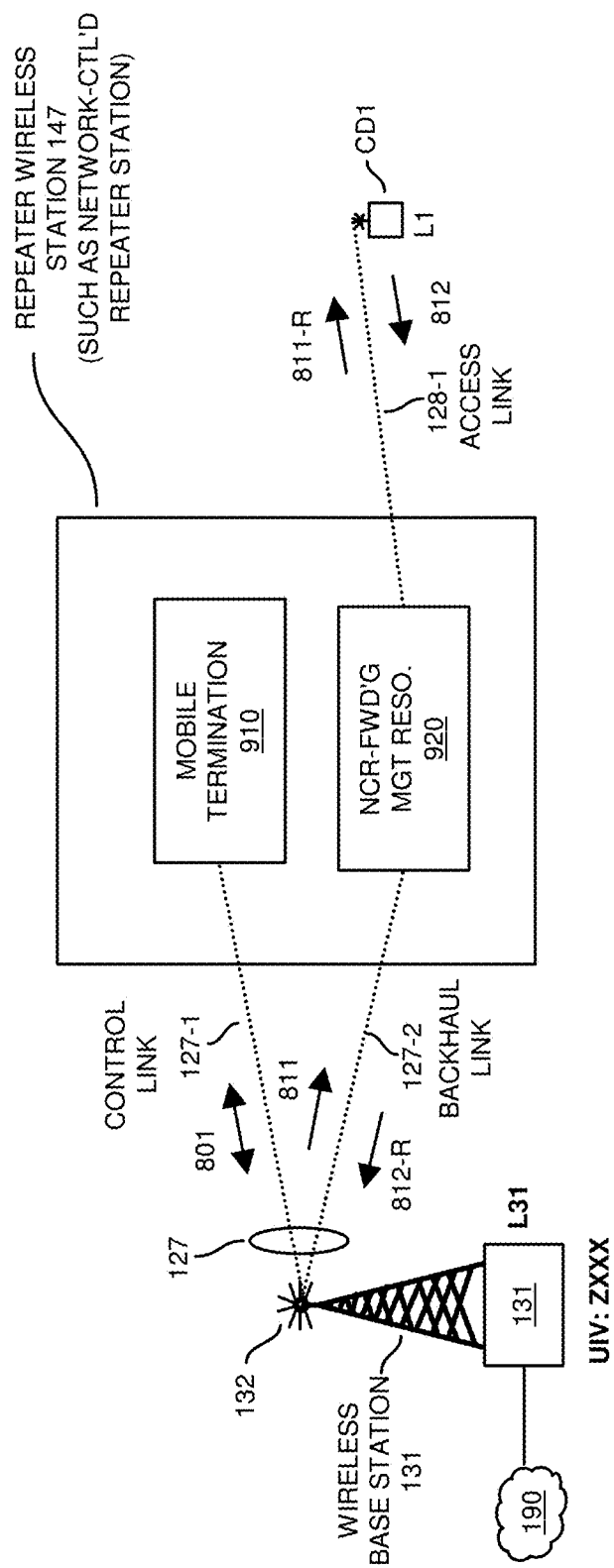
FIG. 8 is an example diagram illustrating a network controlled repeater according to embodiments herein.

FIG. 8 is an example diagram illustrating a network controlled repeater according to embodiments herein.

It should be noted further that embodiments herein include supporting multiband (frequency bands) operations in each of the repeater wireless stations. In one embodiment, each of the control link (127-1) and backhaul link (127-2)/access link (128-1) are inband wireless communication links. This means that, in one embodiment, the control link 127-1 and backhaul link 127-2 share the same antennas to support communications between the wireless base station 131 and the repeater wireless station 147.

In one embodiment, multi-band operation of the communication system as discussed herein means that control link such as wireless communication link 127-1 (to the MT) is implemented in one band (e.g., band FR1) while the "NCR-Fwd links (such as backhaul wireless communication link 127-2 and access wireless communication link 128-1)" is implemented in another band (e.g., such as FR2 band or some other FR1 band). In such an instance, a possible problem is that the wireless system cannot use beam correspondence for the backhaul link and the control link. In this mode, the NCR-Fwd links (backhaul 127-2 and access link 128-1) are assigned beams in same frequency band. To implement remote beamforming in this mode, embodiments herein include the following procedure (method) to provide wireless connectivity to multiple communication devices.

In a first processing operation, the mobile termination (MT) 910 associated with the repeater wireless station 147 attaches itself (establishes wireless communication link 127-1) with the wireless base station 131. As previously discussed, the mobile termination 910 can be configured to connect to the wireless base station 131 in a similar manner that other communication devices can connect with the wireless base station 131.

In one embodiment, the wireless communication link 127-1 (such as a control link) supports conveyance of control information (such as via communications 801) between the wireless base station 131 and the mobile termination 910 of the repeater wireless station 147. For example, as previously discussed, the wireless base station 131 communicates control information to the repeater wireless station 147 to control different operations. In accordance with further example embodiments, the mobile termination 910 of the repeater wireless station 147 can be configured to refine its respective beams towards the wireless base station 131 using the any appropriate beamforming procedure (e.g., the MT 910 can be configured to operate as a UE or mobile communication device).

In a second processing operation, via communications 801, the repeater wireless station 147 reports its capabilities to the wireless base station 131 (gNB). In one embodiment, the repeater wireless station 147 notifies the wireless base station 131 that it can support independent bands (links) for control (such as a wireless communication link 127-1 supporting conveyance of control information) and data portions parts (such as wireless communication link 127-2. In one embodiment, the repeater wireless station 147 reports, to the wireless base station 131 via the control link 127-1, information indicating all bands that the repeater wireless station 147 supports via the NCR-Forwarding management resource 920. The repeater wireless station 147 can be configured to include different antennas to support the control link 127-1 (such as control path) and backhaul wireless communication link 127-2 supporting conveyance of data between the wireless base station 131 and the communication device CD1.

In further example embodiments, the split paths (communication link 127-1, communication link 127-2, and 128-1) support simultaneous conveyance of control communications and data communications.

More specifically, the combination of wireless communication link 127-2 and wireless communication link 128-1 supports data communications between the wireless base station 131 and the communication device CD1 through the so-called network controlled repeater forwarding management resource 920 of the repeater wireless station 147. As previously discussed, the network controlled repeater forwarding management resource 920 (a.k.a., NCR-Fwd link) is a passive link and will just amplify and forward (e.g., replicate) whatever it receives as a wireless signal from the wireless base station 131 or wireless signal it receives from the downstream communication device CD1.

More specifically, as shown in FIG. 8, the repeater forwarding management resource 920 receives wireless signals 811 (directed to the communication device CD1) from the wireless base station 131. The repeater forwarding management resource 920 and forwards (retransmits) and/or amplifies those signals 811 as wireless signals 811-R retransmitted to the one or more communication devices (such as including CD1). In a reverse direction, the repeater forwarding management resource 920 receives wireless signals 812 from the communication device CD1 (and possibly one or more other communication devices) and forwards and/or amplifies those received signals 812 as wireless signals 812-R to the wireless base station 131.
- b. Note that if the repeater wireless station 147 is not configured to include different antennas for wireless communication link 127-1 and wireless communication link 127-2 (such as to support forward path and MT path), then multi-band operations can be supported via using MT and forward traffic in TDM (time-division multiplex) manner. In such an instance, the repeaters will have to tune respective antennas periodically (and as scheduled by the gNB) to different bands (e.g., different wireless channels in different timeslots over time) to receive the control and data traffic at different times using the same wireless band.

In a third processing operation, after the wireless base station 131 (gNB) learns of the multi-band support capability supported by the repeater wireless station 147 such as via communications 801, the wireless base station 131 signals or notifies (via the control channel over the wireless communication link 127-1) the MT 910 of the repeater wireless station 147 to perform beamforming procedures and support all of the wireless bands supported by the wireless base station 131 over wireless communication link 127-2.
- a. The MT 910 will tune its Fwd path (wireless communication link 128-1) to the one or more bands (or wireless channels) as indicated by the wireless base station 131 (as indicated by communications 801). The repeater wireless station 147 then performs RSRP (Reference Signal Received Power) measurements of different SSBs that the repeater wireless station 147 receives from the wireless base station 131 (gNB) in the indicated band.
- b. In further example embodiments, the repeater wireless station 147 then transmits back to wireless base station 131 (gNB) the best SSB or list of best SSBs that will pass a certain threshold using the control link (in different band).
- c. The wireless base station 131 (gNB) then stores this information for future communications with the repeater wireless station 147 on that band. Note that the MT 910 at the repeater wireless station 140 also can be configured to store this information about the best backhaul link for NCR-forward to the one or more downstream communication devices.
- d. The wireless base station 131 (gNB) then performs this beamforming procedure for all the frequency bands that the repeater wireless station may support.

Figure 9:
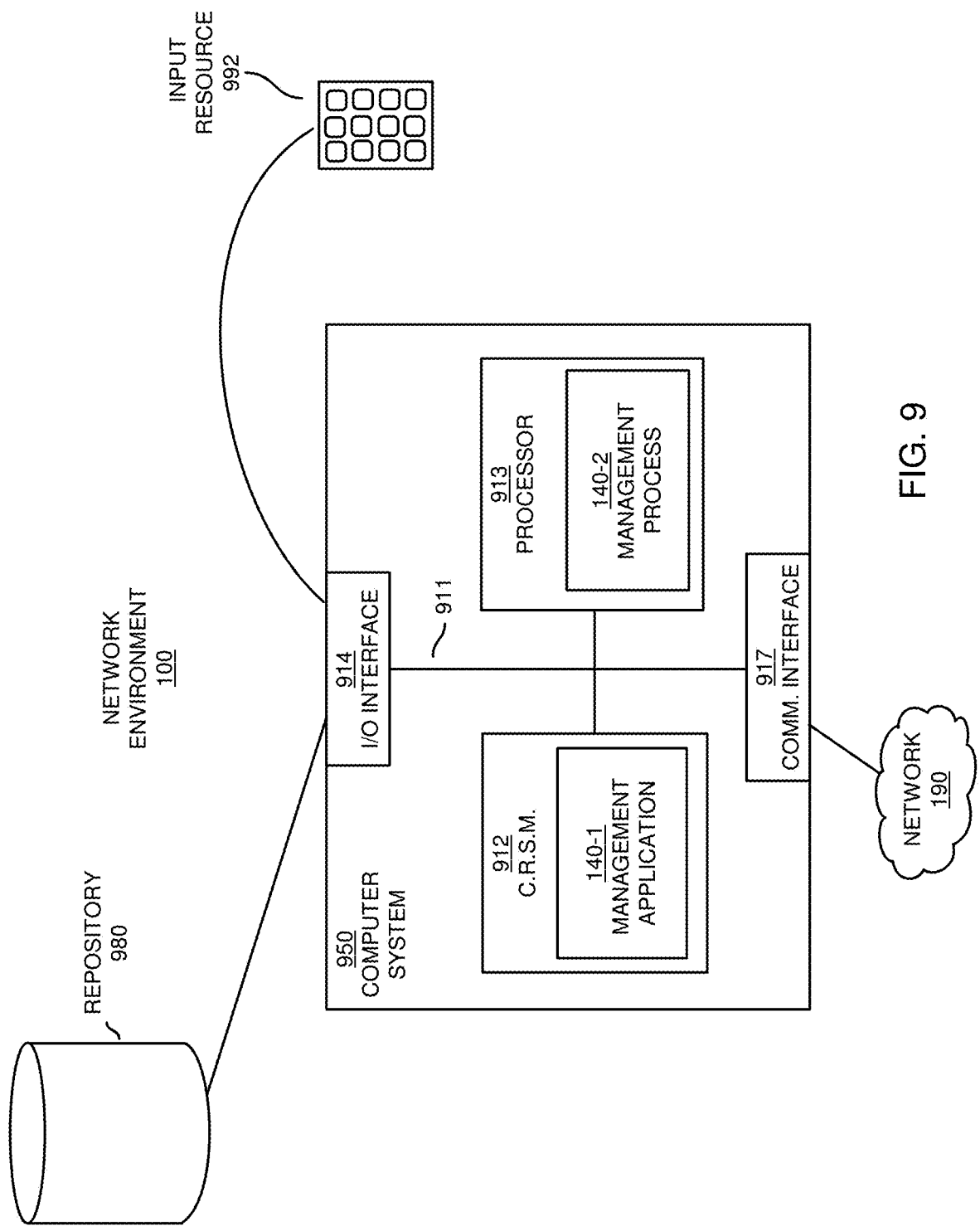
FIG. 9 is an example diagram illustrating example computer architecture operable to execute one or more operations according to embodiments herein.

In a fourth processing operation, the wireless base station 131 (gNB) notifies the repeater wireless station such as via communications 801 over the wireless communication link 127-1 (control link) of one or more frequency bands the repeater wireless station 147 should tune its NCR-fwd (backhaul 127-2 and access link 128-1) to support conveyance of respective data traffic. In one embodiment, if the repeater wireless station 147 does not have the capability of storing the best NCR-Fwd backhaul link information, then the wireless base station 131 (gNB) may also indicate to the repeater wireless station 147 of which backhaul SSB repeater should be used by the repeater wireless station 147 to tune its NCR-Fwd backhaul beam to receive the traffic from gNB in that band.
- a. The repeater wireless station 147 tunes its backhaul (wireless communication link 127-2) and forward links (wireless communication link 128-1) to the corresponding frequency bands (as specified by the wireless base station 131) and receives the SSB information from the wireless base station 131 (gNB) for broadcasting its NCR-Fwd access link beams (SSBs) over wireless communication link 128-1.
- b. The wireless base station 131 (gNB) can be configured to follow the same procedures for RACH occasions as in the inband frequency operations.
- c. Time division and frequency division beamforming modes remain the same as in the inband frequency operations FIG. 9 is an example block diagram of a computer system for implementing any of the operations as discussed herein according to embodiments herein.

Any of the resources (such as wireless base station 131 and corresponding communication management resource, repeater wireless station 147, communication device CD1, communication device CD2, etc.) as discussed herein can be configured to include a respective instantiation of computer processor hardware and corresponding executable instructions to carry out the different operations as discussed herein. For example, a communication management resource (such as associated with one or more of the wireless base station, repeater wireless stations, communication device, etc.) can be configured to execute the (communication) management application 141-1 to execute operations associated with the communication management resource 141.

As further shown, computer system 750 of the present example includes an interconnect 711 that couples computer readable storage media 712 such as a non-transitory type of media (i.e., any type of hardware storage medium) from which digital information is stored and retrieved, a processor 713, I/O interface 714, and a communications interface 717.

I/O interface 714 supports connectivity to repository 780 and input resource 792.

Computer readable storage medium 712 can be any hardware storage device such as memory, optical storage, hard drive, floppy disk, etc. In one embodiment, the computer readable storage medium 712 stores instructions and/or data.

As shown, computer readable storage media 712 can be encoded with management application 141-1 (e.g., including instructions) to carry out any of the operations as discussed herein.

During operation of one embodiment, processor 713 accesses computer readable storage media 712 via the use of interconnect 711 in order to launch, run, execute, interpret or otherwise perform the instructions in management application 141-1 stored on computer readable storage medium 712. Execution of the management application 140-1 produces management process 140-2 to carry out any of the operations and/or processes as discussed herein.

Those skilled in the art will understand that the computer system 750 can include other processes and/or software and hardware components, such as an operating system that controls allocation and use of hardware resources to communication management application 141-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 750 may reside at any location or can be included in any suitable resource in any network environment to implement functionality as discussed herein.

Functionality supported by the different resources will now be discussed via flowcharts in FIGS. 10 and 11. Note that the steps in the flowcharts below can be executed in any suitable order.

Figure 10:
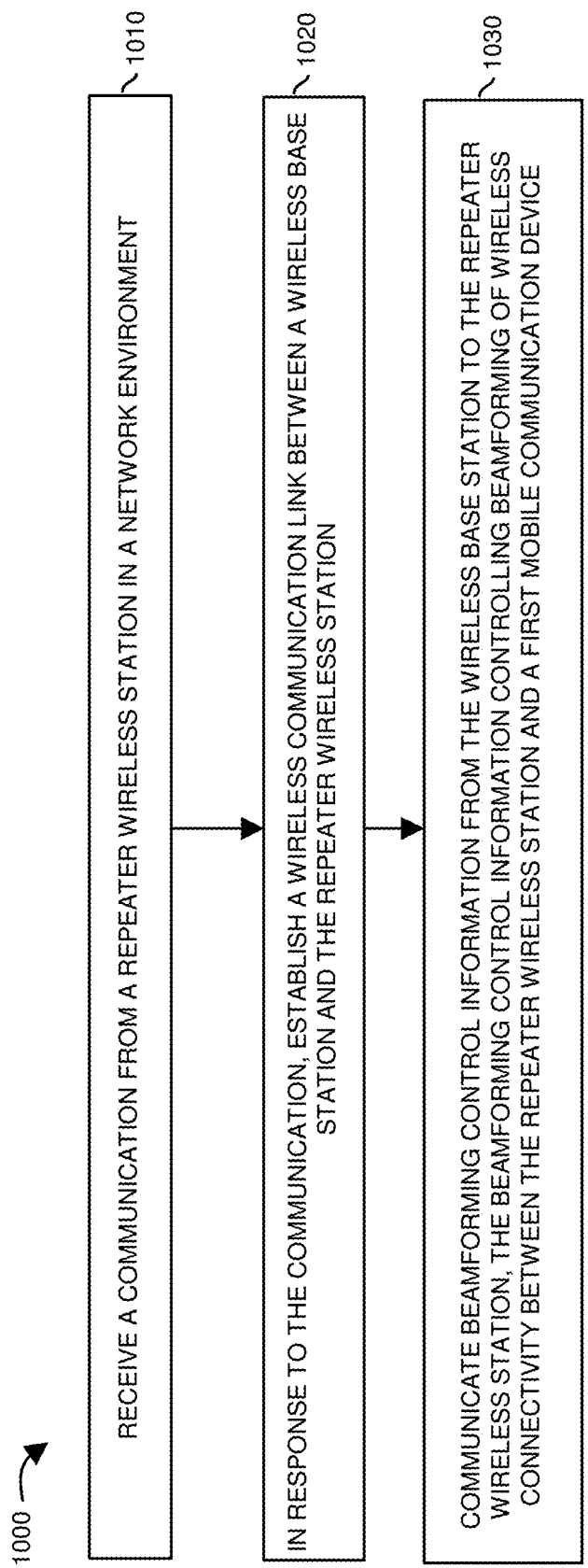
FIG. 10 is an example diagram illustrating a method of configuring a repeater wireless station output support one or more repeated wireless beams according to embodiments herein.

FIG. 10 is a flowchart 1000 illustrating an example method according to embodiments. Note that there will be some overlap with respect to concepts as discussed above.

In processing operation 1010, the wireless base station 131 receives a communication from the repeater wireless station 147 in the network environment 100.

In processing operation 1020, in response to the communication, the wireless base station 131 establishes a wireless communication link 127 between the wireless base station 131 and the repeater wireless station 147.

In processing operation 1030, the wireless base station 131 communicates beamforming control information 185 from the wireless base station 131 to the repeater wireless station 147. The beamforming control information 185 controls beamforming of wireless connectivity (such as one or more wireless beams) between the repeater wireless station 147 and one or more mobile communication devices CD1, CD2, etc.

Figure 11:
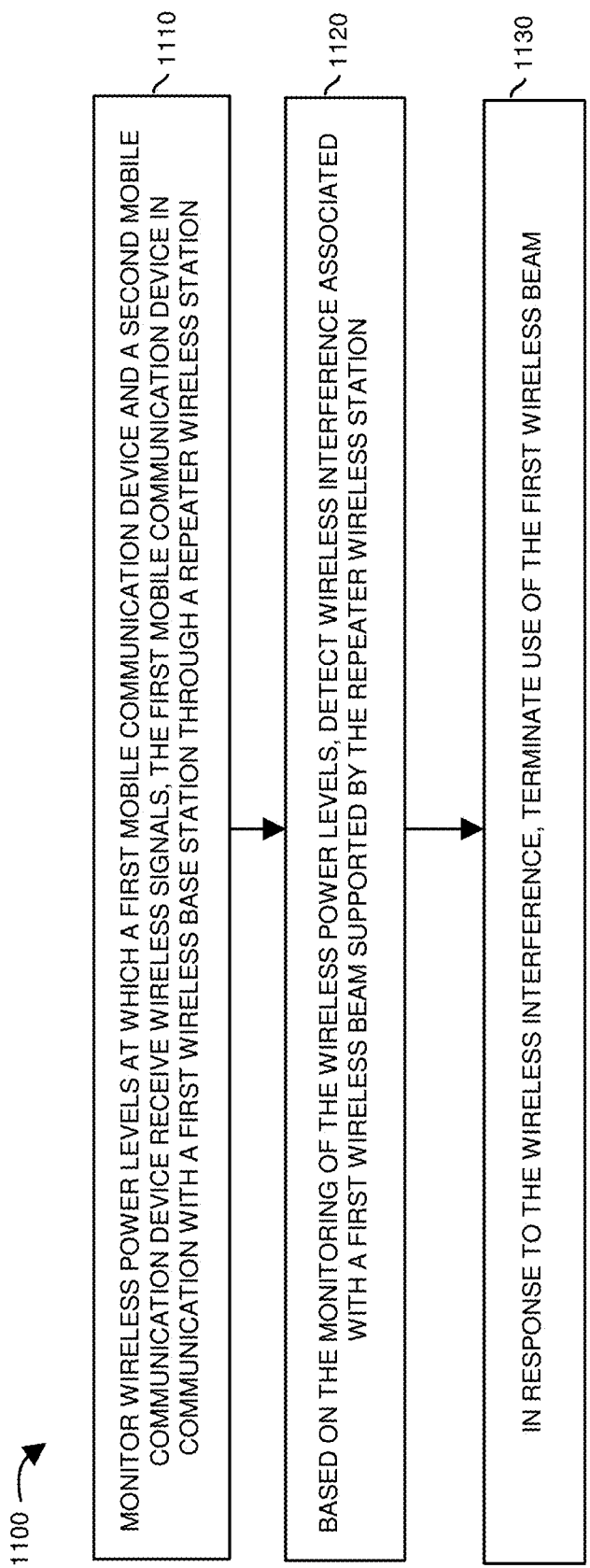
FIG. 11 is an example diagram illustrating a method of reducing wireless interference in a network environment according to embodiments herein.

FIG. 11 is a flowchart 1100 illustrating an example method according to embodiments. Note that there will be some overlap with respect to concepts as discussed above.

In processing operation 1110, a communication management resource of the wireless base station 131 monitors wireless power levels at which a first mobile communication device CD1 and a second mobile communication device CD2 receive wireless signals from the repeater wireless station 147. The first mobile communication device CD1 is in communication with a first wireless base station 131 through the repeater wireless station 147.

In processing operation 1120, based on the monitoring of the wireless power levels, the communication management resource of the wireless base station 131 detects wireless interference associated with a first wireless beam supported by the repeater wireless station.

In processing operation 1130, in response to the wireless interference, the communication management resource of the wireless base station 131 terminates use of the first wireless beam.

Note again that techniques herein are well suited to support more robust and efficient communications in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
monitoring wireless power levels at which a first communication device and a second communication device receive wireless reference signals, the first communication device in communication with a first wireless base station through a repeater wireless station, the second communication device directly in communication with the first wireless base station over a wireless communication link between the second communication device and the first wireless base station;
based on the monitoring of the wireless power levels at which the first communication device and the second communication device receive the wireless reference signals, detecting wireless interference associated with operation of the repeater wireless station communicating with the first communication device over a first wireless beam; and
in response to the detected wireless interference, terminating use of the first wireless beam associated with the repeater wireless station.

2. The method as in claim 1, wherein terminating use of the first wireless beam associated with the repeater wireless station includes communicating a control message from the first wireless base station to the repeater wireless station, the control message notifying the repeater wireless station to terminate use of the first wireless beam.

3. The method as in claim 1, wherein terminating use of the first wireless beam results in a handoff of the first communication device from the repeater wireless station.

4. The method as in claim 1, wherein the terminated use of the first wireless beam results in a handoff of the first communication device from the repeater wireless station to the first wireless base station, the terminated use of the first wireless beam reducing the wireless interference.

5. The method as in claim 1, wherein the first communication device resides in a geographical region disposed between the first wireless base station and the repeater wireless station.

6. The method as in claim 5, wherein the repeater wireless station supports multiple wireless beams to communicate with multiple communication devices, the multiple communication devices including the first communication device, the multiple wireless beams including the first wireless beam prior to the terminated use.

7. The method as in claim 1, wherein monitoring the wireless power levels includes:
communicating a first wireless reference signal from the first wireless base station to the repeater wireless station and the second communication device, the repeater wireless station replicating the first wireless reference signal and transmitting the replicated first wireless reference signal to the first communication device.

8. The method as in claim 7 further comprising:
receiving a first message at the first wireless base station, the first message received from the first communication device through the repeater wireless station, the first message indicating a first power level at which the first communication device received the replicated first wireless reference signal; and
receiving a second message at the first wireless base station, the second message received from the second communication device, the second message indicating a second power level at which the second communication device received the first wireless reference signal.

9. The method as in claim 1, wherein the repeater wireless station supports multiple wireless beams to communicate with multiple communication devices in a network environment, the multiple wireless beams including the first wireless beam prior to the terminated use of the first wireless beam; and
wherein detecting the wireless interference includes detecting that the first wireless beam of the multiple wireless beams causes the wireless interference.

10. The method as in claim 1 further comprising:
subsequent to terminating the use of the first wireless beam, detecting that the termination of use of the first wireless beam reduces wireless interference associated with a first wireless channel used to communicate over the first wireless beam.

11. The method as in claim 1, wherein the wireless reference signals include a first wireless reference signal transmitted by the first wireless base station; and
wherein the first wireless reference signal is received by both the repeater wireless station and the second communication device.

12. The method as in claim 11, wherein the wireless reference signals further include a second wireless reference signal transmitted by the repeater wireless station to the first communication device; and
wherein the second wireless reference signal is a replication of the first wireless reference signal received by the repeater wireless station.

13. The method as in claim 12, wherein the wireless power levels include a first wireless power level and a second wireless power level; and
wherein monitoring the wireless power levels further includes: i) receiving first power signal information from the first communication device, the first power signal information indicating the first wireless power level, the first wireless power level indicating a respective power level at which the first communication device receives the second wireless reference signal from the repeater wireless station, and ii) receiving second power signal information from the second communication device, the second power signal information indicating the second wireless power level, the second wireless power level indicating a respective power level at which the second communication device receives the first wireless reference signal.

14. The method as in claim 13 further comprising:
detecting the wireless interference based on the first wireless power level and the second wireless power level.

15. The method as in claim 14, wherein terminating use of the first wireless beam causes the repeater wireless station to discontinue replication and transmission of wireless communications received from the first wireless base station over the first wireless beam to the first communication device.

16. The method as in claim 15, wherein the terminated use of the first wireless beam causes the first communication device to hand off from the repeater wireless station to the first wireless base station.

17. The method as in claim 12, wherein the detected wireless interference is caused by a combination of the first wireless base station transmitting the first wireless reference signal and the repeater wireless station transmitting the second wireless reference signal; and
wherein the first wireless reference signal and the second wireless reference signal are transmitted using a same channel.

18. The method as in claim 12, wherein the detected wireless interference is caused by a delay between a first time associated with the repeater wireless station receiving the first wireless reference signal and a second time associated with the repeater wireless station transmitting the second wireless reference signal.

19. The method as in claim 1 further comprising:
via the first wireless base station, instructing the first communication device to transmit a second wireless beam from the first communication device toward the first wireless base station to hand off the first communication device from the repeater wireless station to the first wireless base station.

20. The method as in claim 1, wherein the first communication device is configured to execute a beam failure procedure in response to the terminated use of the first wireless beam, the beam failure procedure at the first communication device configured to search for an available wireless base station in which to establish a new wireless communication link.

21. The method as in claim 1 further comprising:
subsequent to a condition in which the first communication device establishes wireless connectivity with the first wireless base station in response to the terminated use of the first wireless beam, testing for the wireless interference again.

22. A system comprising:
a first wireless base station disposed in a network environment including multiple wireless base stations, the first wireless base station operative to:

monitor wireless power levels at which a first communication device and a second communication device receive wireless reference signals, the first communication device in communication with the first wireless base station through a repeater wireless station, the second communication device directly in communication with the first wireless base station over a wireless communication link;

based on the monitoring of the wireless power levels at which the first communication device and the second communication device receive the wireless reference signals, detect wireless interference associated with operation of the repeater wireless station transmitting wireless communications over a first wireless beam to the first communication device; and in response to the detected wireless interference, terminate use of the first wireless beam associated with the repeater wireless station.

23. The system as in claim 22, wherein the first wireless base station is further operative to:

communicate a control message from the first wireless base station to the repeater wireless station, the control message notifying the repeater wireless station to terminate use of the first wireless beam.

24. The system as in claim 22, wherein termination of use of the first wireless beam results in a handoff of the first communication device from the repeater wireless station to the first wireless base station.

25. The system as in claim 24, wherein the first wireless base station is further operative to:

initiate the handoff of the first communication device from the repeater wireless station to the first wireless base station in response to the detected wireless interference.

26. The system as in claim 22, wherein the first communication device resides in a geographical region disposed between the first wireless base station and the repeater wireless station.

27. The system as in claim 22, wherein the first wireless base station is further operative to:

communicate a first wireless reference signal from the first wireless base station to the repeater wireless station and the second communication device, the repeater wireless station replicating the first wireless reference signal and transmitting the replicated first wireless reference signal to the first communication device.

28. The system as in claim 27, wherein the first wireless base station is further operative to:

receive a first message at the first wireless base station, the first message received from the first communication device through the repeater wireless station, the first message indicating a first power level at which the first communication device received the replicated first wireless reference signal; and receive a second message at the first wireless base station, the second message received from the second communication device, the second message indicating a second power level at which the second communication device received the first wireless reference signal.

29. The system as in claim 22, wherein the repeater wireless station supports multiple wireless beams to communicate with multiple communication devices in the network environment; and wherein the first wireless base station is further operative to detect a first wireless beam of the multiple wireless beams causing the interference.

30. The system as in claim 22, wherein the first wireless base station is further operative to:

detect that the termination of use of the first wireless beam reduces wireless interference associated with a first wireless channel used to communicate over the first wireless beam.

31. The system as in claim 22, wherein the first wireless base station includes a computer processor and memory.

32. Computer-readable storage hardware having instructions stored thereon, the instructions, when carried out by computer processor hardware, cause the computer processor hardware to control a set of multiple repeater wireless stations to:

monitor wireless power levels at which a first mobile communication device and a second mobile communication device receive wireless reference signals, the first mobile communication device in communication with a first wireless base station through a repeater wireless station, the second communication device directly in communication with the first wireless base station over a wireless communication link;

based on the monitoring of the wireless power levels at which the first communication device and the second communication device receive the wireless reference signals, detect wireless interference associated with a first wireless beam supported by the repeater wireless station transmitting wireless communications over a first wireless beam to the first communication device; and in response to the wireless interference, terminate use of the first wireless beam.

* * * * *